US012376608B2

(12) United States Patent
Ben-Shitrit et al.

(10) Patent No.: US 12,376,608 B2
(45) Date of Patent: Aug. 5, 2025

(54) MEAT ANALOGUES AND METHODS OF PRODUCING THE SAME

(71) Applicant: REDEFINE MEAT LTD., Tel Aviv (IL)

(72) Inventors: Eshchar Ben-Shitrit, Nataf (IL); Alexey Tomsov, Karmiel (IL); Daniel Mandelik, Rehovot (IL); Daniel Dikovsky, Ariel (IL); Shai Silberstein, Ness Ziona (IL)

(73) Assignee: REDEFINE MEAT LTD., Tel-Aviv (IL)

( * ) Notice: Subject to any disclaimer, the term of this patent is extended or adjusted under 35 U.S.C. 154(b) by 842 days.

(21) Appl. No.: 17/424,090

(22) PCT Filed: Jan. 26, 2020

(86) PCT No.: PCT/IL2020/050099
§ 371 (c)(1),
(2) Date: Jul. 19, 2021

(87) PCT Pub. No.: WO2020/152689
PCT Pub. Date: Jul. 30, 2020

(65) Prior Publication Data
US 2022/0125072 A1 Apr. 28, 2022

(30) Foreign Application Priority Data
Jan. 26, 2019 (GB) .................................... 1901092

(51) Int. Cl.
*A23J 3/22* (2006.01)
*A23J 3/16* (2006.01)
(Continued)

(52) U.S. Cl.
CPC ............... *A23J 3/227* (2013.01); *A23J 3/16* (2013.01); *A23J 3/18* (2013.01); *A23P 20/20* (2016.08);
(Continued)

(58) Field of Classification Search
CPC ...... A23J 3/227; A23J 3/16; A23J 3/18; A23P 20/20; B33Y 10/00; B33Y 80/00
See application file for complete search history.

(56) References Cited

U.S. PATENT DOCUMENTS

| 373,614 A | 11/1887 | Schreidt |
| 3,719,499 A | 3/1973 | Hai et al. |

(Continued)

FOREIGN PATENT DOCUMENTS

| CN | 104750022 A | 7/2015 |
| CN | 204482921 U | 7/2015 |

(Continued)

OTHER PUBLICATIONS

Dick, et al. "3D Printing of Meat." Meat Science, vol. 153, Sep. 24, 2018, pp. 35-44., doi:10.1016/j.meatsci.2019.03.005.
(Continued)

*Primary Examiner* — Erik Kashnikow
*Assistant Examiner* — Assaf Zilbering
(74) *Attorney, Agent, or Firm* — Dorsey & Whitney LLP

(57) ABSTRACT

The present disclosure provides a meat analogue that comprises a protein-based component and a fat-based component separately distributed within the meat analogue; wherein the meat analogue comprises at least one segment that consists essentially of the protein based component which is chemically distinct from at least one other segment that consists essentially of the fat-based component; and wherein at least one of the following is fulfilled (i) a cubic sample of the meat analogue exhibits an anisotropic physical
(Continued)

property and (ii) the meat analogue comprises a non-homogenous distribution of the protein based component and the fat-based component. Also disclosed herein is a method of producing the meat analogue, the method preferably involved digital printing of the meat analogue.

8 Claims, 18 Drawing Sheets

(51) Int. Cl.
    *A23J 3/18*     (2006.01)
    *A23P 20/20*     (2016.01)
    *B33Y 10/00*     (2015.01)
    *B33Y 80/00*     (2015.01)
    *A23P 20/25*     (2016.01)

(52) U.S. Cl.
    CPC ............... *B33Y 10/00* (2014.12); *B33Y 80/00* (2014.12); *A23P 2020/253* (2016.08)

(56) References Cited

U.S. PATENT DOCUMENTS

| | | | |
|---|---|---|---|
| 3,961,083 | A | 6/1976 | Coleman |
| 4,042,715 | A | 8/1977 | Wenger et al. |
| 4,169,161 | A | 9/1979 | Leidy et al. |
| 4,175,486 | A | 11/1979 | Hildebolt et al. |
| 4,305,965 | A | 12/1981 | Cheney |
| 4,449,906 | A * | 5/1984 | Sienkiewicz ............ A23J 3/26 99/450.2 |
| 4,691,161 | A | 9/1987 | Kant et al. |
| 5,433,968 | A | 7/1995 | Zarraga et al. |
| 7,270,829 | B2 | 9/2007 | Van |
| 8,628,815 | B2 | 1/2014 | Torney et al. |
| 8,703,216 | B2 | 4/2014 | Forgacs et al. |
| 9,314,045 | B2 | 4/2016 | Nishimura et al. |
| 10,117,440 | B2 | 11/2018 | Le Paih et al. |
| 10,244,785 | B2 | 4/2019 | Mou et al. |
| 2008/0118607 | A1* | 5/2008 | Sandoval ................ A23J 3/14 426/656 |
| 2009/0208633 | A1 | 8/2009 | Kyed et al. |
| 2012/0093994 | A1 | 4/2012 | Hsieh et al. |
| 2013/0034633 | A1 | 2/2013 | Von |
| 2014/0220217 | A1* | 8/2014 | Brown .................... A23L 27/26 426/574 |
| 2015/0296834 | A1 | 10/2015 | Geistlinger |
| 2016/0066612 | A1 | 3/2016 | Mou et al. |
| 2016/0106142 | A1* | 4/2016 | Contractor ............. A23P 20/20 99/516 |
| 2017/0035076 | A1 | 2/2017 | Geistlinger et al. |
| 2017/0105438 | A1 | 4/2017 | Ajami et al. |
| 2017/0164650 | A1* | 6/2017 | Diaz ...................... B33Y 80/00 |
| 2018/0192686 | A1 | 7/2018 | Shoseyov et al. |
| 2019/0021383 | A1 | 1/2019 | Deo et al. |

FOREIGN PATENT DOCUMENTS

| | | |
|---|---|---|
| CN | 105454446 A | 4/2016 |
| CN | 109152388 A | 1/2019 |
| CN | 109259119 A | 1/2019 |
| EP | 0262276 A1 | 4/1988 |
| EP | 2731446 A1 | 5/2014 |
| EP | 3426057 A1 | 1/2019 |
| EP | 4098127 A1 | 12/2022 |
| JP | 2014520554 A | 8/2014 |
| JP | 2021533749 A | 12/2021 |
| RU | 1818727 A1 | 3/1996 |
| RU | 2442430 C2 | 2/2012 |
| SU | 876090 A1 | 10/1981 |
| WO | 2012051428 A1 | 4/2012 |
| WO | 2017006330 A1 | 1/2017 |
| WO | 2018177717 A1 | 10/2018 |

OTHER PUBLICATIONS

Dick, et al. "Post-Processing Feasibility of Composite-Layer 3D Printed Beef." Meat Science, vol. 153, Nov. 2, 2018, pp. 9-18., doi:10.1016/j.meatsci.2019.02.024.
Dormehl, Luke. "Israeli Startup Believes It Mastered the Art of 3D-Printed Steaks." Digital Trends, Digital Trends, Dec. 3, 2018, digitaltrends.com/cool-tech/jet-eat-3d-printed-vegan-steak.
Mcquarrie , "3D-Printed Meat Substitutes", Nov. 2018, 44 pages, www.trendhunter.com/trends/plantbased-meat-alternatives.
Sher , et al., "Review of 3D Food Printing", Elisava Temes de Disseny, 2015, pp. 104-117.
Kolyohin "Feature: Israeli Startup Makes First 3D-Printed Vegan Steaks with Unique Technology." Xinhua, Dec. 1, 2018, www.xinhuanet.com/english/2018-12/01/c_137642859.htm.
"DPS Joins Forces with Oxfam Novib for IFFA", Dutch Protein & Services, Apr. 2016, 6 pages.
"Proposition for 3D Printed Meat for Aged Care", 3D Printing Progress—https://www.3dprintingprogress.com/articles/10283/proposition-for-3d-printed-meat-for-aged-care, Nov. 2016, 8 pages.
Lotzbeyer , et al., "Towards Printing a Meat-Like Structure Using a Sustainable Plant Proteins", 3D Food Printing Conference, Apr. 2016, 17 pages.
Liu , et al., "The Development of 3D Food Printer for Printing Fibrous Meat Materials", IOP Conf. Series: Materials Science Engineering, 2017, pp. 1-9.
Staff , "3D-Printed Vegan Steak and Fries", https://www.timesofisrael.com/3d-printed-vegan-steak-and-fries-israeli-startup-says-it-has-replicated-meat/, Nov. 2018, pp. 1-3.
Hitti , "Novameat Develops 3D-Printed Vegan Steak From Plant-Based Proteins", https://www.dezeen.com/2018/11/30/novameat-3d-printed-meat-free-steak/, Nov. 2018, 12 pages.
Krintiras , "Intensified Protein Structuring for More Suitable Foods: Development of the Up-Scaled Couette Cell for the Production of Meat Replacers", https://repository.tudelft.nl/islandora/object/uuid%3A03d60954-4f2a-4989-8368-c9ccaf73ca4c, Mar. 2016, 3 pages.
Dekkers , et al., "Structuring Processes for Meat Analogues", Trends in Food Science & Technology vol. 81. https://doi.org/10.1016/j.tifs.2018.08.011, Aug. 20, 2018, pp. 25-36.
Imran , et al., "Production of Plant-Based Meat: Functionality, Limitations and Future", European Food Research and Technology; https://doi.org/10.1007/s00217-023-4287-w, May 22, 2023, 26 pages.

* cited by examiner

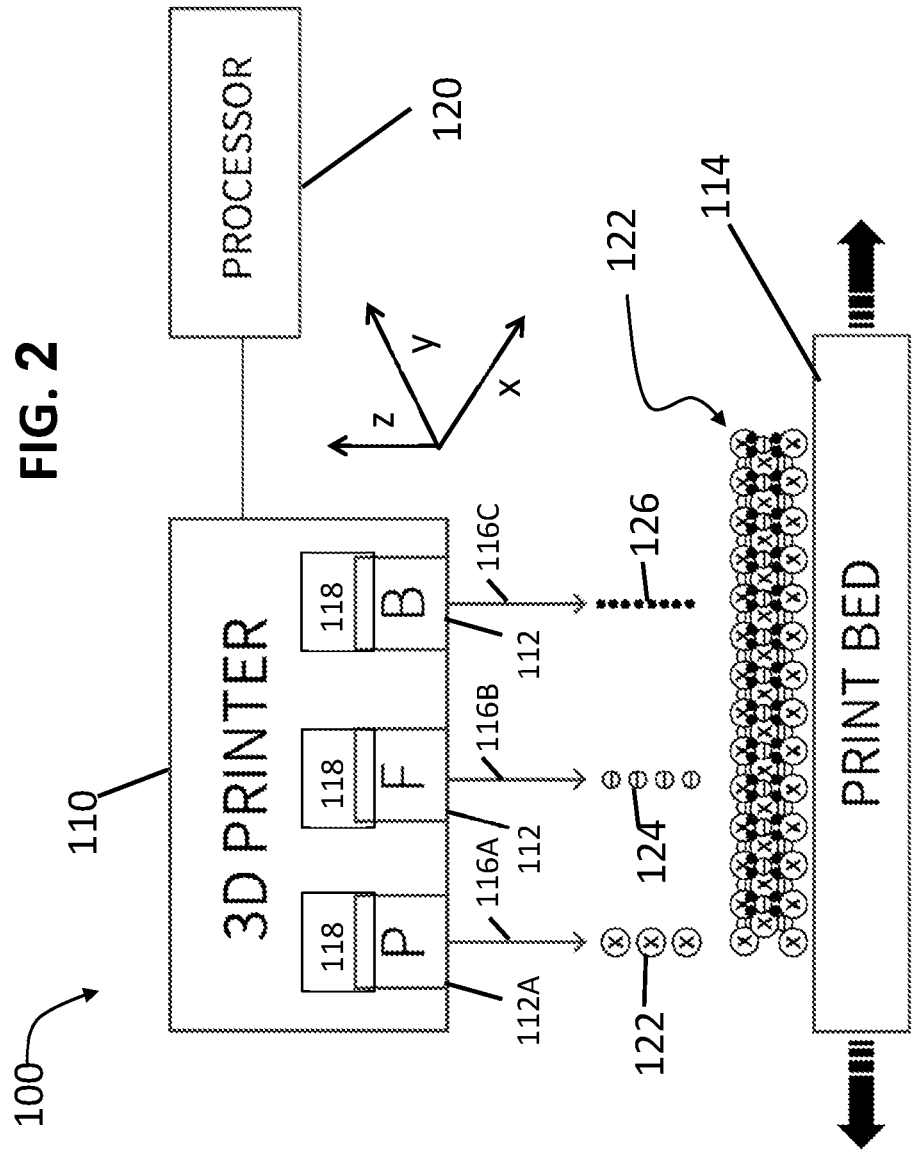

Beef Tenderlion 3D printed meat alternative

Beef Tenderlion 3D printed meat alternative

Beef Tenderlion    3D printed meat alternative
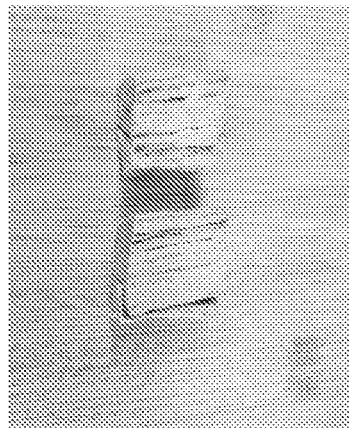
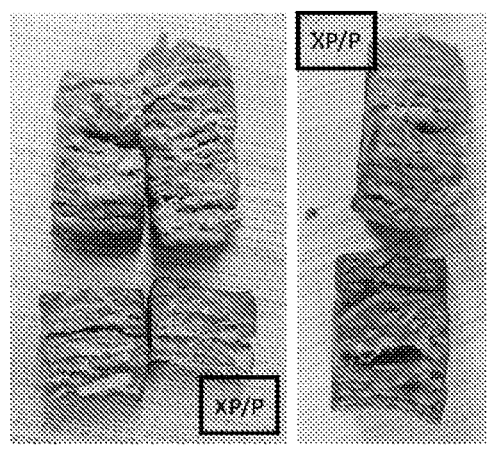
FIG. 12E    FIG. 12F    FIG. 12G
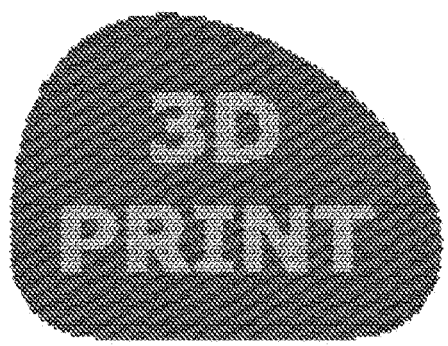
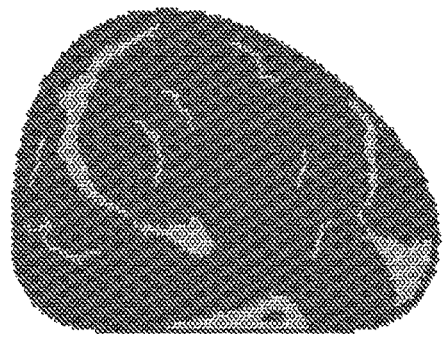
FIG. 13A    FIG. 13B

MEAT ANALOGUES AND METHODS OF PRODUCING THE SAME

TECHNOLOGICAL FIELD

The present disclosure resided in the field of meat analogues.

BACKGROUND ART

References considered to be relevant as background to the presently disclosed subject matter are listed below:
U.S. Pat. No. 4,691,161
US Patent Application Publication No. 20180192686
US Patent Application Publication No. US2017164650
US Patent Application Publication No. US2016066612
C Liu et al. "The Development of 3D Food Printer for Printing Fibrous Meat Material" IOP Conf. Series: Materials Science and Engineering 284 (2017) 012019 doi: 10.1088/1757-899X/284/1/012019
Davide Sher and Xavier Tutó "Review of 3D Food Printing" ELISAVA Temes de Disseny, N°. 31 (2015) pages 104-117 ISSN 2385-7951

Acknowledgement of the above references herein is not to be inferred as meaning that these are in any way relevant to the patentability of the presently disclosed subject matter.

BACKGROUND

The development of 3D printing (Additive Manufacturing) has grown significantly. The technology has been applied in various fields such as medicine, aviation, automobile, architecture modeling and more recently, it is being successfully applied to food processing, and widely appreciated by food science researchers. 3D printing research is typically focusing on the ink's properties, printer design, and printing parameters.

U.S. Pat. No. 4,169,161 describes simulated multi-phased meat-like products containing vegetable protein, albumen, fat, and water which are prepared from uncolored and colored emulsions which are layered into a loaf to produce distinctly colored regions. The loaf is coagulated with heat, and sliced into strips which when fried visually and texturally resemble fried meat, particularly bacon.

US Patent Application Publication No. 20180192686 describes a process and system for the production of a nutritional low-caloric food product, and food products produced thereby. The process comprises formulating each of at least one nutritional material (e.g. protein) and at least one edible non-caloric, cellulose nano material and depositing the formulation(s) into a desired form, by 3-dimensional printing (3D printing), to form a food product of a predetermined texture and nutritional and caloric content.

US Patent Application Publication No. US2017164650 describes a method for the production of an edible object, comprising providing an edible powder composition and at least one edible liquid, wherein the edible powder composition comprises a water soluble protein, a hydrocolloid and a plasticizer, and subjecting the composition to powder bed printing by depositing the edible liquid by spraying it onto the powder and thereby obtaining the edible object. Also food products obtained with the method, particularly, a pasta, a cake object and a protein bar are described.

US Patent Application Publication No. US2016066612 describes a 3D meat substitute forming apparatus including a control computer for previously storing an image file of a meat model and outputting a control command corresponding to the image file of the meat model. The powdery meat substitute material is a powdery non-meat protein food material. A 3D meat substitute forming method includes a pretreating process, a soaking and grinding process, a slurry boiling and filtering process, an atomization drying process, a powder spreading and stratifying process, a printing and solidifying process, a laminating process and an excess powder removing process.

C Liu et al. (2017) describe the development of 3D food printing of fibrous meat materials. Specifically described is a system that uses two pressurized tanks and two extrusion nozzles, the first set of nozzle and pressurized tank extruding fibrous material to form block shape with porous texture and the second set of nozzle and pressurized tank injecting liquid pork essence, chicken essence etc. into the porous material to form a juicy and moisturized food material.

Davide Sher and Xavier Tutó (2015) provide a review of 3D food printing and inter alia refers to the Foodini 3D printer making use of a syringe-based system to extrude different paste materials, from dough to chopped meat, and the challenges ahead with turning 3D meat production into an economically viable solution.

General Description

In accordance with a first of its aspects, the present disclosure provides a meat analogue comprising a protein-based component and a fat-based component separately distributed within the product; wherein the product comprises at least one segment that predominantly comprises or consists essentially of the protein based component which is chemically distinct from at least one other segment that predominantly comprises or consists essentially the fat-based component; and is characterized by at least one of the following:
  in a cubic sample of the product, an anisotropic physical property.
  a non-homogenous distribution of the protein based component and the fat-based component.

Also provided by the present disclosure is a method for producing the meat analogue disclosed herein, the method comprises printing layers comprising one or both of protein-based component and a fat-based component,
  wherein said printing is configured to provide
    one or more segments predominantly comprising or consisting essentially of the protein-based component which are chemically distinct from other segments that predominantly comprise or consist essentially of the fat-based components; and at least one of the following:
    a non-homogenous distribution of the protein based component and the fat-based component; and
    an anisotropic physical property, in a cubic sample of the product.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2 is a schematic illustration of elements of a 3D printer which can be used in accordance with a non-limiting example of the present disclosure.

FIG. 12A-12G are images of 3D printed meat alternatives in accordance with some examples of the present disclosure (FIGS. 12B, 12D, 12F and 12G) in comparison to bovine meat products-beef tenderloin (FIGS. 12A, 12C, 12E).

FIGS. 13A-13H provide illustrations of various meat analogues in accordance with some non-limiting examples of the present disclosure.

DETAILED DESCRIPTION

Figure 1A:
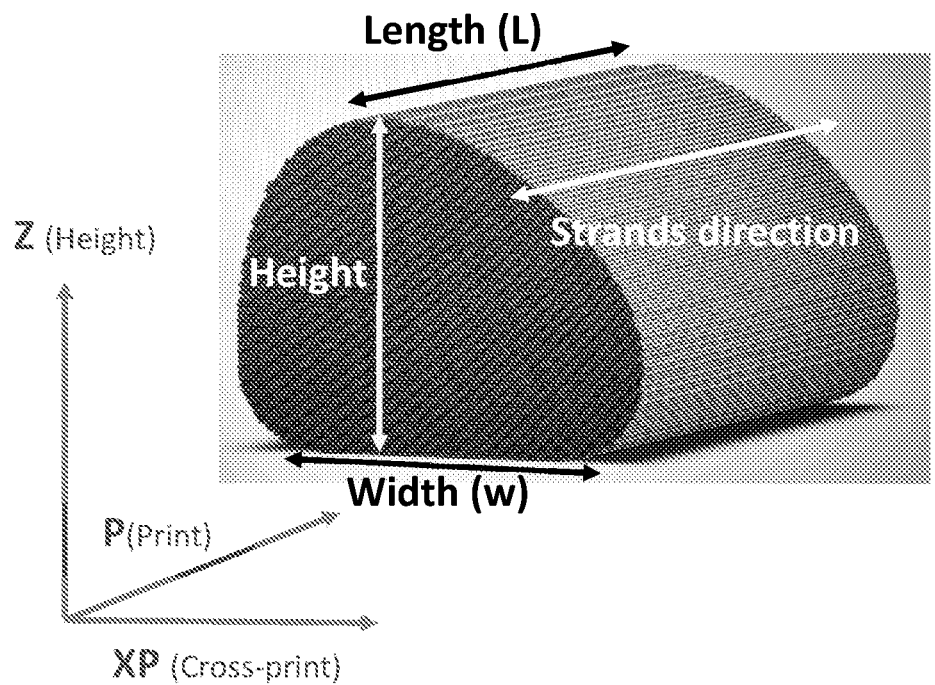
FIG. 1A-1B provide a 3D model of a beef-like meat alternative slab (FIG. 1A) with an indication of the printing (strand) direction, and an image (FIG. 1B) of an actual bovine meat slab with an indication of the length axis, width axis and height axis.

The present disclosure provides meat analogues and methods of producing the same.

In the context of the present disclosure it is to be understood that the meat analogues provided herein resemble or are aimed at resembling real meat products in terms of taste, texture, consumer experience and other properties as typically examined by those versed in the art.

The present disclosure thus provides a meat analogue comprising a protein-based component and a fat-based component separately distributed within the product; wherein the product comprises at least one segment that predominantly comprises or consists essentially of the protein based component which is chemically distinct from at least one other segment that predominantly comprises or consists essentially of the fat-based component; and in a cubic sample of the product, the product exhibits an anisotropic physical (preferably textural) property.

In the context of the present disclosure the term "segment" should be understood as denoting a sample or a portion of the product that in principle can predominantly comprise or consist essentially only of the protein based component, predominantly comprise or consist essentially only of the fat based component, or it can contain both the protein based component and the fat based component.

Further in the context of the present disclosure, when referring to "chemically distinct" it is to be understood that the compared components differ one from the other by the presence or absence of a chemical/biological entity, by including different amounts of the same chemical/biological entity etc.

In the context of the present disclosure when using the expression "predominantly comprises or consists essentially of" in connection with the composition of a segment of the product it is to be understood that at least 50% by volume, at times at least 60% by volume, at times at least 70% by volume, at times 80% by volume and at times even at least 90% by volume is made from the recited component. Similarly, when referring to an ingredient in a component e.g. protein or fat such that a component "predominantly comprises or consists essentially of" the recited type of ingredient (e.g. protein or fat), it is to be understood that the component comprises more than the recited type of ingreidnet than others. For example, a protein based component that comprises predominantly protein is to be understood as one comprising at least 5%, at times at least 10%, at times at least 20% w/w more protein than fat or carbohydrates or other non-protein material; similarly, for example, a fat-based component that comprises predominantly lipophilic material is to be understood as one comprising at least 5%, at times at least 10%, at times at least 20% w/w more lipophilic material than protein or other non-lipophilic material.

In the context of the present disclosure, when referring to a protein-based component it is to be understood as a composition comprising water and edible protein material. The protein material can include a single type or a combination of proteins, peptides, oligopeptides and amino acids.

The protein based component within the meat analogue is used to imitate a muscle portion of the meat and thus is designed and constructed to have the texture of a muscle, even and specifically after cooking the product. The protein based component can include one or more proteins in combination with other non-protein material, e.g. water and fat.

In some examples, the protein-based component comprises one or more proteins.

The protein(s) can be of any source that is acceptable and safe for human use or consumption.

In some examples, the protein(s) are of a non-mammal source. A non-mammal source can include, without being limited thereto, plant source, arthropods (e.g. insects), algae, fungus (e.g. yeast), bacteria or other microorganism.

In some other examples, the protein(s) are of a non-animal source. A non-animal source includes plant source as well as protein material obtained from cell culture, even if the cell is an animal cell.

In some examples, the protein(s) comprise plant proteins. The plant proteins can be in the form of a pure protein, a protein isolate, protein concentrate, protein flour, texturized protein such as texturized vegetable protein (TVP).

In the context of the present disclosure, TVP is used to denote both dry form of texturized vegetable protein (sometimes regarded to as expanded TVP), as well as high moisture form, known in the art as the outcome of high moisture extrusion (HME) or high moisture extrusion cooking (HMEC) or similarly.

The protein(s) can be of any plant source, this includes, without being limited thereto, wheat, legume (pulses, beans, peas, lentils, nuts), plant seeds and grains (e.g. sunflower, canola, rice), stem or tuber protein (e.g. potato protein).

In some examples, the protein is derived from legume. Specific, yet non-limiting examples of legume/bean proteins include, soy protein, pea protein, chickpea protein, lupine protein, mung-bean protein, kidney bean protein, black bean protein, alfalfa protein.

Some specific, yet not limiting, proteins suitable for meat alternatives as disclosed herein are beta-gonglycinin, glycinin, vicilin, legumin, albumins, globulins, glutelins, gluten, gliadins, glutenins, mycoproteins.

The protein component can include a single type of protein or a blend of proteins. One example of a protein to be used as a single protein or in combination with other proteins is gluten.

One other example of a protein that can be used as a sole protein in the protein based component or in combination with other proteins is beta-conglycinin soy protein (isolate or concentrate).

In yet another example, at least part of the protein-based components contain animal derived components, e.g. beef muscle, chicken muscle, egg protein, milk protein, insect based protein, etc., or achieved by means of cell culturing techniques.

In yet another example, at least part of the protein-based components contains recombinant proteins, derived from e.g. plants, algae, fungi or microorganisms.

Within the meat analogue disclosed herein the protein-based component can be in any chemical or physical form.

In some example, the protein-based component is a dough (e.g. thick malleable paste).

In some other examples, the protein-based component is in a form of a gel.

In some other examples, the protein-based component is in a form of an emulsion.

In some examples, the protein-based component is in the form of texturized protein. In this context, when referring to a texturized protein matter it is to be understood as defining the physical state of the protein within the component. In some examples the protein competent is comprised of protein molecules bound to water that are texturized to create a fibrous structure. In other examples, the texturized protein component comprises protein molecules that are substantially aligned in a certain direction as to create a substantially aligned fibrous structure. The alignment of the protein material can be achieved, for example, by cooking extrusion processes, shear (Couette) cell and/or spinning all well known in the art, as well as by cold extrusion in which pre-existing bundles of proteinous fibers in a dough are forced through a narrow passage in order to align them with respect to the extrusion direction.

In some examples, the texturized protein comprises or is textured vegetable proteins (TVP) including, for example, textured soy, textured pea, textured wheat gluten, and combinations of same.

In some examples, the protein-based component is a combination of gel, emulsion and texturized protein.

In this connection, it is to be noted that the product disclosed herein can contain the same protein based component in the entire product, yet, in some examples, the product can contain a combination of different types of protein-based components. The difference in the protein-based components within a single product can be exhibited by any one of the following difference in the composition of the components, e.g. in the types and or degree of purity of proteins included within the different protein-based components and/or in the amounts of proteins included within the different protein-based components (even if the same proteins are used among the different protein based components in a single product), difference in the water concentration, fat concentration and/or different types and/or concentrations of food additives known in the food industry (such as flavor materials, coloring agents)

difference in the texture of the protein-based component such that for example, some protein-based components within a product can be highly texturized (preferably fibrous, preferably substantially aligned fibrous) and some less texturized, so they exhibit different textural behavior.

difference in the form of the protein-based component such that some protein-based components within a product can be in the form of a gel and some others, within the same product, can be in the form of a dough and/or an emulsion.

In some examples, the protein-based component is in a form of a dough in the entire protein-based segments of the product.

In some other examples, the protein-based component is in a form of a gel in the entire protein based segments of the product.

In some other examples, the protein-based component is in a form of a emulsion in the entire protein based segments of the product.

The amount of protein in the protein based component may vary depending, inter alia, on the type of proteins, desired physical (preferably at least one textural) properties, other substances with which they are combined etc. Yet, the protein based component comprises between 5w % to 60w %, preferably 10w % to 40w % (wet base) protein material. The rest being typically fat, carbohydrates and mostly water or an aqueous based media.

The amount of protein can be determined by techniques known in the art. For example Kjeldahl method using a specific Jones factor.

In the context of the present disclosure, when referring to a fat-based component it is to be understood as a composition of matter comprising water and lipophilic material.

The fat-based component may comprise emulsifying agents, e.g. proteins, as well as other emulsifiers known in the art.

The fat-based component within the meat analogue is used to imitate animal fat tissue and thus is designed and constructed to have the properties of an animal fat tissue, such as texture and liquid release characteristics under heating. Specifically, under typical cooking conditions of animal meat, melted fat is gradually released out of the fat-based component, such that the fat-based component retains its overall structural integrity (i.e. it may shrink to some extent but would not melt completely out of the product). The fat-based component can include one or more lipophilic compounds to constitute the lipophilic material, in combination with other non-lipophilic material, e.g. protein. Yet, when referring to a fat-based component it is to be understood that, other than water, the lipophilic material constitutes the majority of the component.

The term lipophilic material should be understood to encompass a single type or combination of lipophilic compounds. As appreciated, a lipophilic compound is one that has the ability to dissolve in fats, oils, lipids and non-polar solvents and in the context of the present disclosure the lipophilic material can include, without limiting to, any one or combination of fatty acids, fatty alcohols, oils, lipids, butter and fats in general.

In some examples, the fat-based component comprises one or more lipophilic compounds.

The lipophilic material can be of any source that is acceptable and safe for human use or consumption.

In some examples, the lipophilic material is of a non-mammal source. A non-mammal source can include, without being limited thereto, synthetic or semi-synthetic lipophilic compounds, plant source.

In some examples, the lipophilic material comprise plant derived lipophilic compounds.

In some examples, the lipophilic material comprises at least one oil, specifically, plant derived oil. A non-limiting list of plant derived oils include corn oil, olive oil, soy oil, peanut oil, walnut oil, almond oil, sesame oil, cottonseed oil, rapeseed oil, canola oil, safflower oil, sunflower oil, flax seed oil, algal oil, palm oil, palm kernel oil, coconut oil, babassu oil, wheat germ oil, and rice bran oil.

In some examples, the lipophilic material comprises at least butter. A non-limiting list of edible butters that can be employed within the lipophilic material include shea butter, mango butter, cocoa butter and kukum butter.

In some examples, the lipophilic material comprises at least one fatty acid (saturated and unsaturated). In some examples, the fatty acid is a C6-C24 saturated or unsaturated fatty acid.

In some examples, the lipophilic material comprises fat material, such as, without being limited thereto, glycerides (monoglycerides, diglycerides, triglycerides). A specific, yet non-limiting example of a triglyceride is lecithin or lysolecithin.

In some examples, the lipophilic material is one derived from algae, fungi or microorganism (e.g. archaea), either recombinantly or not.

In some examples, the lipophilic material is derived from animal source, or contains products derived recombinantly that are identical to animal-based materials. Without being limited thereto, the lipophilic material can be derived directly from animal or extracted from animal cell culture. Examples include, without being limited thereto, pig fat (lard), bovine fat, chicken fat, duck fat.

In some examples, the fat-based component can contain fat-substitutes, for example so as to reduce the calories of the resulting product. Fat substitutes are known in the art and can be divided into four categories, carbohydrate based (e.g. cellulose, dextrins, modified starches, fruit based fibre, grain based fibre, hydrocolloid gums, maltodextrin, pectin), protein based (e.g. microparticulate protein, modified whey protein concentrate), fat based (e.g. altered triglycerides, sucrose polyesters, esterified propoxylated glycerol) and combinations of same [Position of the American Dietetic Association: "Fat replacers". Journal of the American Dietetic Association. 105 (2): 266-275. 2005, the content of which is incorporated herein by reference].

In some examples, the fat-based component comprises lipophilic material that has a viscosity at 30° C. of between 3,000 and 1,000,000 centipoise (cP), at times, between 10,000 and 300,000 centipoise.

In some examples, the fat-based component comprises lipophilic material that has a melting point temperature in the range of 30° C. to 80° C.

In some examples, the fat-based component comprises an oleogel or organogel.

As appreciated, according to the polarity of the liquid phase, gels can be classified as hydrogels, emulgels and oleogels/organogels. When the gelled liquid phase is water the gels are called hydrogels and if an emulsion is gelled, a biphasic formulation is defined as an emulgel.

If the dispersed liquid is a vegetable oil, mineral oil or organic solvent and is structured by an organogelator, then the gel is named an oleogel/organogel.

In the food industry, oleogels were developed to modify the physical properties of oils to resemble those of fats and thereby allow the combination of oil in food products that require a specific texture and rheology. The oleogels are based on the incorporation of specific molecules such as polymers, amphiphiles, waxes into the oil that will alter the physical properties of the oil so that its fluidity is decreased.

Oleogels in general and edible oleogels are known in the art and in the context of the present disclosure will be selected to provide the fat-based component with the desired texture and rheology that mimics the fat tissue of animal meet. More specifically, edible oleogels are composed of an edible liquid phase that is entrapped by a structurant network, ultimately leading to the formation of a gel.

Oleogels can be defined as semisolid systems, with a continuous phase made of a hydrophobic liquid (like a vegetable oil) where a self-assembled network (composed by the structurant) is responsible for the physical entrapment of the liquid. According to the desired physical characteristics and the food type application, oleogels with different properties may be produced. The structural conformation is dependent on the type of structurant used, which will dictate the desired final application of the oleogels [Martins, A. J., Vicente, A. A., Cunha, R. L., & Cerqueira, M. A. (2018). Edible oleogels: an opportunity for fat replacement in foods. Food & Function, 9 (2), 758-773. Doi: 10.1039/c7fo01641g, the content of which is incorporated herein by reference].

A non limiting list of structurants used in edible oleogels comprise ethyl cellulose (EC), natural waxes (plant and animal) and natural resins, phytosterols and oryzanol, fatty acid derivatives, and lecithin.

In some examples, the structurant is ethyl cellulose. In some examples, the olleogel is formed by mixing under heating ethyl cellulose with edible vegetable oil e.g. edible triacylglycerols, at a temperature within the range of 80° C. to 300° C., typically under inert atmosphere in a manner as described in US2015/0157038, the content of which is incorporated herein by reference.

In some examples, the structurant is a natural wax, such as candelilla wax, sunflower wax, carnauba wax, rice bran wax, beeswax and shellac wax. [Martins, A. J et al. 2018 ibid.]. The ratio between the structurant and the oil can vary and in some examples, the weight ratio is within the range of 99:1 to 75:25.

The art provides various types of oleogel, including, without being limited thereto, crystalline particle oleogels, crystalline fiber oleogels, polymeric strand oleogels, particle-filled network oleogels, and liquid crystalline mesophase oleogels.

Oleogels of the crystalline particles category can be formed by liquid triacylglycerol, which is trapped inside the network of crystalline triacylglycerol particles. The mechanical properties of these oleogels depend on the size, shape, and interaction between the crystal particles. Common structurants in this category include diacylglycerols, monoacylglycerols, fatty acids, wax esters/sorbitan monostearate, lecithin/sorbitan tristearate, and ceramides.

The crystalline fiber category of oleogels may include structurants that are low in molecular weight and are able to self-assemble into fibrillar networks.

The polymeric strand oleogels can be formed by biopolymers such as cellulose, starch, and gelatin.

The particle-filled network olcogels can be formed when a continuous liquid (e.g. oil) phase is filled with solid or liquid particles. Particle-filled network oleogels require that the solid/liquid particles serve as inert particles and have to be present in large concentrations. When the particles extend beyond the close packing fraction, the network is formed by the mechanical contact between them. The network forms a suspension system when the inert particles are solid, but forms an emulsion when the inert particles are liquid. One example of such a network system is peanut butter, in which about 50% of the system, by weight, may be solid non-fat particles dispersed in peanut oil.

A liquid crystalline mesophase system is another type of oleogel network that can be used in the context of the present disclosure. A liquid crystalline mesophase system is formed by scaffolds in the oil, which scaffolds have oil as the continuous phase and with liquid crystals space in the continuous phase.

An example of an oleogel that was used in accordance with the present disclosure (see examples below which constitute part of the present disclosure) was obtained by mixing ethyl cellulose and vegetable oil (weight ratio of about 1:2).

In some examples, the fat-based component comprises an emulsion. The emulsion can be a water in oil emulsion, an oil in water emulsion and an oil in oil emulsion. In some cases, in order to facilitate the formation of an emulsion, the fat based component comprises one or more emulsifying agents.

The amount of fat in a fat-based segment may vary. In some examples, in a wet sample of the product, namely, where no water or moisture has been actively removed from the sample that contains a fat-based component, the amount of lipophilic material is within the range between 20w % to 100% w % out of the weight of the wet sample. In some preferred examples, a wet sample comprising the fat-based component comprises between 60w % to 97w % lipophilic matter.

The amount of lipophilic material within a fat-based component can be determined by techniques known in the art. For example, a solvent extraction-gravimetric method and/or Gas chromatograph (GC).

The meat analogue disclosed herein is characterized by a non-homogenous distribution of components such as the protein based component and the fat-based component therein. The term "non-homogenous distribution" should be understood to mean that the product can contain segments that are different in their composition one from another.

Non-homogeneity or lack of homogeneity of the meat analogue of the present disclosure can be defined by dimensions of a meat alternative and deviation values, as known in the art.

Further, The non-homogeneity can be exhibited with various components of the product, including the distribution of the protein-based component, the fat-based components, water-based component (described below) as well as the other components such as colorants, favoring agents, and the like so as to increase resemblance to a true whole muscle slab.

Figure 1B:
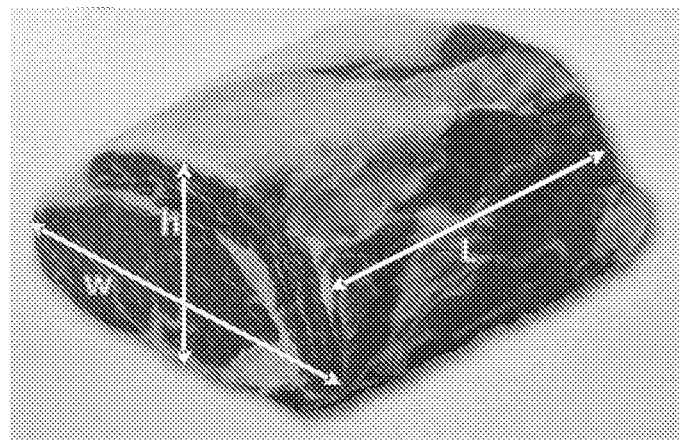

For example, in a meat slab as illustrated in FIGS. 1A-1B, can be defined using spatial dimensions, taking into consideration its width axis ("w", also referred to as the XP axis), height axis ("h" also referred to the Z axis) or length axis ("L", parallel to the strands direction, also referred to as the P axis).

Based on the dimensions of the three different axes, a slab can be defined as a small slab, medium slab or large slab.

For example (numbers refer to cm):

| Slab dimensions | L | h | W |
|---|---|---|---|
| Small | 5-30 | 5-10 | 8-12 |
| Medium | 10-50 | 10-15 | 12-20 |
| Large | 30-100 | 15-30 | 20-40 |

Accordingly, when defining a steak dimension, one refers to its length, height and width dimensions. Specifically, a steak is typically cut from a meat slab perpendicularly to the P axis such that it has the same width and height of the slab from which it is cut, but the length value (i.e. the steak thickness) would typically be 0.5-10 cm, irrespective of whether the slab was a large, medium or small slab.

The slab homogeneity characteristics can then be further defined by any one of the following quantitative parameters/values:

High-Resolution Deviation

A slice along the meat alternative slab is taken, perpendicular to the printing direction (P). The slice area is divided to virtual grid of cells size 2 mm*2 mm. At each cell of 2 mm*2 mm the percentage of the fat component is measured.

The standard deviation of these percentages is taken and a ratio is calculated by dividing these percentages by the maximal possible standard deviation, which is obtained when all cells either contain 100% or 0% of the measured component. This ratio is assigned as the high-resolution deviation.

If the percentage of each cell is $V_i$, the high-resolution deviation is:

$$\frac{\sqrt{\langle V_i^2 \rangle - \langle V_i \rangle^2}}{\sqrt{\langle V_i \rangle - \langle V_i \rangle^2}}$$

Where < > means average.

High values of this deviation points on pockets of the measured material (like fat pockets), while low values points on a more homogeneous texture.

Medium-Resolution Deviation

Calculated in the same manner as high-resolution deviation, but with a cell size of 1 cm*1 cm.

Low value teaches on homogeneity between bites and is preferred for some product types. For example, a hamburger is preferred to be with low deviation, in order to keep same concentration of fat pockets in each bite. Ground meat production cannot achieve low deviation, while 3D printing can.

Low-Resolution Deviation

Calculated in the same manner as high-resolution deviation, but with a cell size that is 4 cm*4 cm.

Generally, the low-resolution deviation is lower than medium-resolution, and the medium-resolution is lower than the high-resolution.

Product Directionality

A slice of the product is taken along the XP/Z plane (perpendicular to the printing direction P). The slice area is divided into virtual columns at width of 1 cm, where the columns are along a specific direction. At each column the percentage of the fat is measured.

The standard deviation is calculated, with weighting by the total projected length (the length is dependent on the product shape)

$$D_i = \sqrt{\frac{\Sigma(V_i^2 \cdot L_i)}{\Sigma L_i} - \frac{\Sigma(V_i \cdot L_i)}{\Sigma L_i}}$$

Where $V_i$ is the projected value and $L_i$ is the total projected length.

This deviation is calculated for multiple directions, where the columns angles to XP axis are: 0° to 170°, taken in steps of 10°. The modulation of the values of all directions ($D_i$) is the product directionality.

Modulation is calculated as:

$$\frac{\text{Max}(D_i) - \text{Min}(D_i)}{\text{Max}(D_i) + \text{Min}(D_i) + 0.5}$$

Where a constant is added to the denominator in order to overcome natural variance of $D_i$ at low concentrations of the fat component.

While method of full layer manufacturing gives product with high directionality, printing methods can obtain low directionality Local Directionality A slice of the product is taken along the XP/Z plane (perpendicular to the printing direction P). The slice area is divided into virtual grid of 1 mm*1 mm cells.

For each cell, located at least 1 cm from the product boundaries, a local directionality is calculated. The vicinities of the cell at size of 2*2 cm is projected in a few directions (0° to 170°, taken in steps of) 10°, the standard deviation is calculated for each direction and the modulation is found, in the same manner as for the product directionality.

A correction factor of 0.035 is subtracted, to overcome directionality of random concentration of the measured component Finally, the value is multiplied by the average concentration of the fat component ($C_i$) in the cell vicinity (in a radius of 2 cm).

$$\text{Local Cell Directionality}_i = \left(\frac{\text{Max}(D_i) - \text{Min}(D_i)}{\text{Max}(D_i) + \text{Min}(D_i)} - 0.035\right) * C_i$$

After calculating the local cell directionality for all the cells, the mean of all is taken and divided by the concentration of the fat component at the entire product.

Product Spread

This value measures the spread of the areas that contain high percentage of the fat component.

As in the high-resolution deviation a slice of the product along the XP/Z plane (perpendicular to the printing direction) is taken, and divided into virtual grid of cells size 2 mm 2 mm. If the area contains mostly (>50%) the measured component, the cell is assigned as positive, else as negative.

The product spread is defined as the weighted average distance of positive cells, which is calculated by $$\frac{\left\langle \Sigma_{j \text{ is positive}} \, e^{\frac{-\text{Distance between } i \text{ and } j \text{ cells}}{1 \text{ cm}}} \right\rangle_{i \text{ is positive}}}{137.83}$$

Where the 137.83 factor is the maximal weighted distance sum for a single cell. High spread means that the measured component is ordered as big bunches at size of 1 to few centimeters. This may be at protein products with large areas of fat (to mimic steaks and products with decorations).

For the sake of illustration, a comparison was made between digitally printed meat analogue s according to the present disclosure and prior art meat analogue s that are produced by other techniques not involving digital printing.

Table 1A provides a description of the various examined alternative meat products including exemplary 3D printed meat alternatives as disclosed herein (identified by the abbreviation RdM), and the qualitative values of the parameters, while Table 1B provides quantitative values for these exemplary 3D printed meat alternatives, both tables show the non-homogeneity of the meat analogues subject of the present disclosure vis-à-vis the homogeneity of the otherwise produced meat alternatives as known in the art. With respect to the exemplary 3D printed meat alternatives discussed in Tables 1A and 1B reference is also made to FIGS. 13A-13H.

TABLE 1A

Structural Heterogeneity Qualitative values for products of different production techniques

| Structural heterogeneity Qualitative compare | Deviation [High] | Deviation [Med] | Deviation [Low] | Spread | Directionality | Local Dir |
|---|---|---|---|---|---|---|
| Single component 3D printed meat analogue | Low | Low | Low | NA | Low | Very low |
| Ground meat analogue | High | Medium | Low | Low | Low | Low |
| Molded meat analogue | High | High | High | High | High | High |
| RdM hamburger analogue | High | Low | Very Low | Very Low | Low | Low |
| RdM decorated meat analogue | High | Medium | Low/ Medium | Medium | Low | Low/ Medium |

TABLE 1A-continued

Structural Heterogeneity Qualitative values for products of different production techniques

| Structural heterogeneity Qualitative compare | Deviation [High] | Deviation [Med] | Deviation [Low] | Spread | Directionality | Local Dir |
|---|---|---|---|---|---|---|
| RdM steak analogue | High | Medium | Medium | Low | Medium-Low | Medium/High |
| RdM Wagyu steak analog | High | Medium-Low | Low | High | Medium-Low | Medium/Low |

TABLE 1B

Deviation values for the disclosed products, illustrated in FIGS. 13A-13H

| Structural heterogeneity values | Figure No. | Deviation [High] | Deviation [Med] | Deviation [Low] | Spread | Directionality |
|---|---|---|---|---|---|---|
| RdM decorated meat analogue | 13A | 0.939 | 0.657 | 0.250 | 0.296 | 0.170 |
| RdM steak analogue 1 | 13B | 0.889 | 0.637 | 0.147 | 0.152 | 0.166 |
| RdM steak analogue 2 | 13C | 0.920 | 0.711 | 0.209 | 0.205 | 0.147 |
| RdM steak analogue 3 | 13D | 0.942 | 0.800 | 0.365 | 0.271 | 0.284 |
| RdM steak analogue 4 | 13E | 0.805 | 0.493 | 0.228 | 0.177 | 0.159 |
| RdM steak analogue 5 | 13F | 0.869 | 0.592 | 0.156 | 0.151 | 0.164 |
| RdM hamburger analogue | 13G | 0.860 | 0.464 | 0.114 | 0.043 | 0.044 |
| RdM Wagyu steak analogue | 13H | 0.771 | 0.368 | 0.276 | 0.359 | 0.171 |
| Claimed requirement | | RdM > 0.7 | 0.36 < RdM < 0.9 | RdM < 0.4 | RdM > 0.1 | RdM < 0.4 |

The data shown in Table 1A indicate that 3D printed products as disclosed herein, possess distinctive structural heterogeneity characteristics that are different from other meat analogue products known in the art.

The data in Table 1B provides the calculated values for representative/exemplary 3D printed products, as shown in FIGS. 13A-13H. Table 1B also provides a range for each parameter that covers the characteristics of the products disclosed herein. Thus, in accordance with some examples of the present disclosure, a meat analogue disclosed herein will meet at least one, at times a combination of the above parameter ranges.

In some examples, the meat analogue disclosed herein has a deviation [high] that is greater than 0.5, preferably greater than 0.7.

In some examples, the meat analogue disclosed herein has a deviation [med] that is between 0.2 and 0.95, preferably between 0.36 and 0.9.

In some examples, the meat analogue disclosed herein has a deviation [low] that is less than 0.6, preferably less than 0.4.

In some examples, the meat analogue disclosed herein has a spread that is greater than 0.05, preferably greater than 0.1.

In some examples, the meat analogue disclosed herein has a directionality that is less than 0.6, preferably less than 0.4.

In some examples, the meat analogue disclosed herein exhibit all the above parameters, that together represent a distinctive characteristics of the meat analogue disclosed herein.

In some additional examples, the meat analogue can be characterized by product repeatability, which emphasizes the capability to produce multiple products having the same structure-either when cut from the same slab or between different slabs. Repeatability is defined as following:

Product Repeatability

Product repeatability measures the amount of change between two products of the same type.

As in high-resolution deviation a slice of the product is taken along the XP/Z plane (perpendicular to the printing direction P), and divided into virtual grid of cells in size 1 mm*1 mm. At each cell of the percentage of each component (protein, fat, other) is measured.

The same is then carried out for another slice (from the same slab or different one) and the difference of corresponding cells of the 2 slices is determined, and the standard deviation of the differences is calculated.

The product repeatability is the ratio between the standard deviation and the mean of all component percentage at the 2 products.

If the percentage of each cell in the first slice is $V_i$, and in the second slice is $W_i$, the product repeatability is $$1 - \frac{\sqrt{\langle(V_i - W_i)^2\rangle - \langle V_i - W_i\rangle^2}}{(\langle V_i\rangle + \langle W_i\rangle)/2}$$

In some cases, high repeatability is required, in order to produce the same product every time. Such repeatability cannot be achieved by stochastic production, like, blending or mixing, but can be achieved by 3D printing. At other cases, low repeatability is required in order to mimic real meat-products and the 3D printing can provide this as well, thanks to its ability to control the distribution of various components in the product.

Note that these deviations can be calculated on the entire slab, while using volume (3D) cells, instead of area (2D) cells.

The calculated repeatability values are given in Table 1C, while the column titles indicate the anticipated inaccuracy of the 3D printing system in both XP and Z axes.

TABLE 1C

Meat analogue repeatability

| Structure | 0.4 mm | 1 mm | 2 mm |
|---|---|---|---|
| Decorated meat analogue | 0.986 | 0.944 | 0.873 |
| RdM steak analogue 1 | 0.985 | 0.944 | 0.887 |
| RdM steak analogue 2 | 0.987 | 0.950 | 0.893 |
| RdM steak analogue 3 | 0.990 | 0.962 | 0.911 |
| RdM steak analogue 4 | 0.986 | 0.945 | 0.894 |
| RdM steak analogue 5 | 0.984 | 0.939 | 0.879 |
| RdM hamburger analogue | 0.987 | 0.948 | 0.873 |
| RdM Wagyu steak analogue | 0.990 | 0.956 | 0.915 |
| Claimed requirement | RdM > 0.98 | RdM > 0.93 | RdM > 0.87 |

Thus, in some examples, the meat analogue disclosed herein has a repeatability criteria that is greater than 0.8, at times, greater than 0.85, at times, greater than 0.9.

It is further stated that if the majority of slab cuts meets the repeatability criteria listed in Table 1C it indicates substantial orientation of the fat elements in P direction and is generally characteristic of RdM 3D printed steak analogues.

The meat analogues disclosed herein comprise at least protein based component(s) and a fat based component(s) and is constructed in a manner to exhibit an anisotropic physical (and specifically texture) profile with respect to at least one physical parameter, when the latter is measured from three different, essentially orthogonal directions (e.g. 80° to 100° between them) of a symmetrical sample (e.g. cubic) of the product. This unsymmetrical physical (or more specifically textural) profile is referred to as an anisotropic physical (textural) property of the product.

In the context of the present disclosure, it is to be understood that the term "cubic sample" denotes a sample taken from a meat alternative produce by performing cuts along three different essentially orthogonal directions, with at least a first cutting axis being along the average direction of the protein fibers and the other cuts are along any axis perpendicular to the first cutting axis. In this connection, reference is also made to FIG. 1A and FIG. 1B illustrating orthogonal axes in a meat slab. According to FIGS. 1A and 1B the cutting of cubic sample includes at least one cut along the length axis L (P axis).

In the context of the present disclosure it is to be understood that an anisotropic physical property of the product is exhibited in value difference of at least 10%, at times at least 20%, at times at least 50% when the physical property is measured in a sample of the product of at least 0.5 cc, at three different essentially orthogonal directions, as further explained below.

In the specific non-limiting examples of fibrous meat analogue disclosed herein, and more specifically substantially aligned fibrous meat analogue, the axes by which the anisotropy reaches its maximal value are the axis along the average fibers' direction and any axis perpendicular to the former.

In the specific non-limiting examples of a printed meat analogue disclosed herein, the axes by which the anisotropy reaches its maximal value are the axis along the printing direction P (being typically similar to the average fibers' direction in a substantially aligned fibrous meat analogue), and any axis perpendicular to P axis, i.e. any axes inside XP-Z plane.

A non-limiting list of examples of anisotropic physical properties that can characterize the meat analogue disclosed herein includes thermal conductivity, electrical conductivity, elastic modulus, shear modulus, yield strength, and textural properties known in the art of food technology, such as chewiness, gumminess, hardness, young module, cohesiveness and adhesiveness. Any of these properties can be used independently or in any combinations to define the meat analogue disclosed herein.

In some example, the anisotropic physical property is an anisotropic textural property, as further discussed below.

In the case of anisotropic foods, the properties of the food material/product are direction dependent. Meat is known to be an anisotropic food due to its fibrous nature. For example, the presence of fiber bundles in beef results in different values of texture profile as well as thermal conductivity, when measured parallel to the fibers versus perpendicular to them.

For example, tensile strength (breaking stress in tension) along a meat muscle fibre direction is much greater than at right angles to it, both in raw meat and cooked meat. Cooked meat toughness, as measured by the force required to drive a blunt blade through the meat is greater when cutting across the muscle fibers than along them. [J. M. V. Blanshard, J. R. Mitchell "Food Structure: its creation and evaluation", p 234 (1988, the content of which is incorporated herein by reference].

In some cases, the meat analogue disclosed herein mimics the anisotropic properties such as texture behavior of true meat.

In some examples, the anisotropic physical property is a textural property, such as hardness, gumminess, chewiness, young module, cohesiveness and adhesiveness, each constituting a separate embodiment for characterizing the product of the present disclosure.

The anisotropic textural profile can be determined by techniques known in the art, e.g. using Texture Profile techniques, as further discussed below.

The meat analogue can also comprise other components.

In some examples, the meat analogue comprises also a third component that is referred to herein, interchangeably, by the term a water-based or aqueous based or moisture component. This component comprises water solutions or water based gels carrying various solutes and/or suspended/dispersed material such as colorants, salts, thickening agents, fillers, stabilizers, emulsifiers, etc. as further detailed below.

Without being bound thereto, the water-based component is constructed to function as the alternative to animal muscular liquid.

In some examples, the water based component in the product comprises an amount of water between 70w % to 97w % when extracted from at least one sample of at least 0.5 cc of said product.

Water content of the water based component can be determined from samples of water based component extracted from 'pockets" within the product in which the water based component is held, providing such pockets are large enough to be sampled out of the product. Such water based component can then be analyzed using TGA (thermogravimetric analyzer). Further, water content in general and water content inside the water based component located inside pockets, can be determined by performing a super/hyper spectral imaging, showing regions of high water content between the protein.

In some examples, the water-based component is in a form of a gel at temperatures in the range of 15° C. to 80° C., at times, in the range of 20° C. to 65° C. This can be determined from samples taken from pockets that are larger than about 0.5 mm, by measuring a rheological property, e.g. storage moduli, G' change over temperature range (e.g. temperature sweep method)

In some examples, the water based component comprises any one or combination of the following edible additives:

Colorants—including, without being limited to, annatto extract, caramel, malt extracts, beet extracts, elderberry extract, lycopene, paprika, turmeric, *spirulina* extract, carotenoids, chlorophyllin, anthocyanins, and betanin; at times, the colorant can also be a natural colorant, e.g. from plant, from yeast or from cell culture, such as Heme.

Emulsifiers and stabilizers—including, without being limited thereto, pea extract, mustard, lecithin, cellulose, potato protein extract. The emulsifiers and stabilizers are regarded, at times, as a texturizing agent Acidulants—including, without being limited thereto, vinegar, lactic acid, citric acid, tartaric acid, malic acid, and fumaric acid.

Flavoring agents—including, without being limited thereto, monosodium glutamate, plant extracts, black pepper, yeast extracts, salt, aromatic oils;

Thickening agents—including, without being limited thereto, polysaccharides and galactomannans such as starch, modified starch, maltodextrin, carrageenan, guar gum, alginin, agar, grain flour mix, carboxymethyl cellulose, pectin, locust beam gum and xanthan gum. The thickening agent is regarded, at times, as a texturizing agent.

Antioxidants—including, without being limited thereto, ascorbic acid, rosemary extract, aspalathin, quercetin, and tocopherols;

Dietary fortifying agents—including, without being limited thereto, amino acids, minerals;

Preservatives—including, without being limited thereto, hydroxybenzoate, nitrite, nitrate, sorbic acid, sodium sorbate, sorbates lactic acid, celery extract, propionic acid, benzoic acid, and sodium propionate;

Vitamins—including, without being limited thereto, niacin, Vitamin B12;

Sweeteners—including, without being limited to, *stevia*, sucralose, sugar alcohols, sucrose, glucose, fructose, and aspartame.

In some examples, the water based component comprises at least 0.5w % thickening agent or gelling agent.

In some examples, the product comprises, as part of the water based component, modified starch.

In some examples, the product comprises, as part of the water based component, maltodextrin.

In some examples, the product comprises, as part of the water based component, agar.

It is to be noted that any one or combination of the above additives can be included in the protein based and/or fat based components as well.

The meat analogue disclosed herein also comprises, in accordance with some examples, at least one bonding/binding agent.

In the context of the present invention a binding agent is any substance that contributes to the integrity of the product, i.e. to ensure and/or maintain the product's cohesiveness and/or structural stability.

Cohesiveness describes how well a food retains its form between the $1^{st}$ and $2^{nd}$ chew. Meats have high cohesiveness while, for example, peaches have low cohesiveness properties. This Cohesiveness value is directly related to the tensile and compression strength of the food product.

In some examples, the binding agent is any one or combination of gluten, such as wheat gluten, egg whites, gums and hydrocolloids, enzymes, cross-linking gelling agents and starches.

In some examples, the enzymes are of a type that catalyze the formation of disulfide bonds and/or isopeptide bonds. In some examples, the enzyme is transglutaminase.

In some examples the binding agent comprises a hydrocolloid. Hydrocolloids are already used in meat products to improve functional properties and at times compensate undesirable effects of fat reduction, salt reduction and freeze/thaw processes.

The hydrocolloid employed in the context of the present disclosure can contain a single type of hydrocolloid such as, and without being limited thereto, carrageenan, alginate (e.g. calcium alginate), konjac gum, flaxeed gum, or locust bean gum.

In some examples, the hydrocolloids are formed of a combination of substances, creating synergy, such as those listed above.

The binding agent can be incorporated within any of the components of the product and/or it can be present between segments formed by the different components.

In some examples, the binding agent, e.g. hydrocolloids, are an integral part of the protein based component.

In some examples, the meat analogue comprises pockets/zones of the fat-based components and/or pockets of the water based components. In this context a 'pocket" denotes a segment that is predominantly or that consists essentially of the fat-based component or water based component, the segment being essentially or even entirely surrounded/encased by the protein based component. Without being bound by theory, it is assumed that the essential overall (e.g. above 90%) or even complete encasing of the fat and/or water based components with a protein-based component, during cooking, or otherwise manipulating the product, prevents the leakage of the lipophilic material and/or water-based component from the product during its processing, thereby maintaining the juiciness and/or mouthfeel of the product. See in this connection, Examples 11 and 12 below.

In some examples, marks may be formed on the outside of the product (the meat slab) either by creating grooves and/or using color contrast between components (e.g. protein component vs. fat component), that would indicate the preferred locations in which the product should be cut in order to avoid cutting through such pockets. See in this connection, exemplary FIGS. 7D-7F.

In some examples, the meat alternative is constructed such that the entire printed product, e.g. meat slab is 'coated', from part or all directions (circumferentially), with a protein based component so as to hold together the product and prevent it from possible collapsing. In this connection, please see example of 3D Assembly Plan #1 and Assembly Plan #7.

The meat analogue disclosed herein can be characterized by values defined by a qualified sensory panel and/or by instruments such as a texturometer (also know as texture profile analyzer—TPA). The texturometer applies a test where a product sample is compressed twice and the force-time curves are analyzed to provide texture profile analysis (TPA) parameters for the sample. Scales have been developed for rating the degree of hardness, brittleness, chewiness, gumminess, cohesiveness and adhesiveness of the sample, as perceived by a sensory panel, even for meat [Szczesniak et al. The Texturometer—A New Instrument For Objective Texture Measurement, Journal of Food Science, Volume 28, pp 390-396 (1963), the content of which is incorporated herein by reference].

In the following, the TPA tests were performed according the following conditions: A 20×20×20 mm specimen was cut from a 3D printed slab, while keeping the planes orthogonal to the slab axes system (P/XP/Z, illustrated as L/w/h in FIG. 1A-1B).

Instrument: LLOYD testing machine, equipped with 100N load cell

Test setup: A 20×20×20 mm specimen was compressed by 50% between two parallel plates (at room temperature) at a 90 mm/min rate in two compression cycles separated with a 3 second delay. The following major parameters were extracted:

Young's modulus
Cohesiveness
Hardness (first peak and second peak)
Chewiness

The meat analogue resembles in structure, composition and in texture a whole muscle meat portion. As such, it can be provided in a form of a slab representing a bulk of food products that can be sliced to create steaks, similar to primal cut of beef or other known meat analogue products, or in a form of a sliced portion, e.g. steak portion.

In some examples, the meat analogue is printed as a whole slab, for later slicing into steaks and/or into any other desirable form (e.g. rectangular pieces for stews).

The meat analogue can then be processed according to conventional culinary methods, including frying, boiling, chopping, cooking, etc.

The present disclosure also provides a method of producing a meat analogue as described herein.

The method comprises, printing layers comprising one or both protein-based component and fat-based component, as defined herein.

The printing is executing in accordance with a predefined material/matrix assembly plan, dictating the manner by which the different components are dispensed, so as to provide a meat analogue being characterized by any one of the following:
  one or more segments in the meat analogue that predominantly comprise or consist essentially of the protein-based component, the protein based component(s) being chemically distinct from other segments in the meat analogue that predominantly comprise or consist essentially of the fat-based components;
  an anisotropic physical (preferably textural) property in a cubic sample of the meat analogue and optionally,
  a non-homogenous distribution of the protein based component and the fat-based component.

In non-limiting examples of the method disclosed herein, the axes by which the anisotropy reaches its maximal value are the axis defined by the print direction (P) and any axis perpendicular to the former (e.g. XP or Z). This is even more prominent in cases where substantially aligned fibrous structure exists in the protein based component, typically aligned along the print (P) direction as disclosed herein.

The method disclosed herein can be performed manually, i.e. each layer is applied manually, but preferably the layering of the components of the meat analogue is conducted digitally, in accordance with a pre-defined assembly plan that controls the spatial distribution and layering of the protein-based component and the fat based component one with respect to the other.

In some examples, the method comprises printing layers, one on top of the other, such that each layer comprises a monolayer of printed/deposited strands of the protein based component.

In some examples, deposition of at least one of the components by at least ink-jetting.

In some examples, the method comprises printing of layers, one on top of the other, such that each layer comprises a monolayer of printed/deposited strands of the fat based component.

In some examples, the method comprises printing of layers, one on top of the other, such that each layer comprises a monolayer of printed/deposited combination of strands of the fat based component and protein based component.

The meat analogue can be completely printed, namely, each and every component of the meat analogue is incorporated into the meat analogue using printing techniques.

However, in some cases, some of the components of the meat analogue are applied in a different manner, such as by spraying and/or spreading over a printed layer or over a part of a printed layer, dipping, soaking, etc. for example, when present in the meat analogue, the binding agent can be applied onto a layer, e.g. by spraying and/or spreading, once the printing of the layer is completed.

In some examples, the method comprises texturizing at least the protein-based component. The texturization can be performed before depositing of the protein based component, during deposition of the protein based component or immediately thereafter.

In some examples, the texturization is obtained by at least extruding the protein based component. It is noted that also the other components can be subjected to extrusion.

In some examples, texturization of the protein based component is performed in full or partially, before deposition of the component onto the printing bed or over the previously printed layer.

In some examples, texturization of the protein based component is performed during deposition of the component onto the printing bed or over the previously printed layer.

In some examples, texturization of the protein based component is performed after deposition of the component onto the printing bed or over the previously printed layer.

In the latter case, post-deposition texturization can be performed utilizing curing techniques. Without being limited thereto, curing can be performed by any one or combination of
  applying a bonding agent; non-limiting examples of bonding agents are provided hereinabove.
  applying a texturizing agent, such as in the case of calcium alginate system;

exposure to infra-red (IR) radiation;
exposure to ultraviolet (UV) radiation; such as Mercury lamp or UV LED source, producing peaks between 350 nm and 420 nm, utilizing photo-initiators, e.g. CIBA Irgacure 2959, at about 0.1% to 1% w/w.
heating or cooling;
removing or introducing moisture (rehydration or dehydration).

The curing can be performed after depositing an entire layer, after depositing a portion of a layer, after depositing a few layers or even after completing the printing of the complete meat analogue.

The curing can be carried out to obtain any one of the following: solidify the different components in the meat analogue after they are printed, to stabilize a layer before printing the next layer; to induce or facilitate texturization after printing, to induce or facilitate bonding of components.

In some examples, the printing of the components is in a form of strands. In some examples, the strands have a dimensionless aspect ratio (L/D) or a median dimensionless aspect ratio (L/D) median in the range of 10 to 10,000, preferably 50 to 1000, more preferably 100 to 500, L being the strand length, and D being its diameter.

In some examples, the meat analogue is obtained by printing the protein-based components and at least a portion of one other, non-protein based components, such as the fat-based components, is applied otherwise (i.e. not by printing per se).

In some examples, at least some of the non-protein based components are applied by dipping or soaking the already printed protein-based component within the other component, the later being in fluid form. For example, the already printed layers can be dipped in a liquified/melted fat-based component and/or in water-based component, that would thus fill gaps between segments of protein based component, typically before it solidifies.

In some examples, at least some of the non-protein based components are applied by spraying and/or spreading the other component over the already printed protein-based component. For example, the water-based component (blood substituted) and/or other component having a primary function of binding can be sprayed and/or spread and/or dispensed (e.g. powder) over the already printed layers that contain at least the protein-based component but typically also fat-based components.

In some other examples, at least some of the non-protein based components are dispersed over an existing layer or a portion thereof, when these components are in dry powder and/or aggregate form, and dispensing an aqueous solution (be it water, or a solution comprising desired ingredients) on the powder only at the locations where the settling of the non-protein components are desired. Once the hydrated non-protein components are settled in place the remaining powder can be removed by any available means.

In some examples, printing of the layers is such that at least one exterior surface of the layered, 3-dimensional meat analogue is devoid of at least one or both of said water-containing component and said fat-containing component.

In some examples, printing of the layers is such that all exterior surfaces (i.e. the entire surrounding) of the layered, 3-dimensional meat analogue is devoid of at least one or both of said water-containing component and said fat-containing component In some examples, printing of the layers is such that an interior of the layered, 3-dimensional meat analogue contains a higher concentration of said water-containing component with respect to a concentration of said water-containing component on a or said at least one exterior surface.

In some examples, printing of the layers is such that an interior of the layered, 3-dimensional meat analogue contains a higher concentration of said fat-containing component with respect to a concentration of said fat-containing component on a or said at least one exterior surface.

The printing of the layers is preferably conducted using a 3D printer. The method can be performed using commercially available 3D printers modified to allow the printing of strands of at least the protein-based component. For the sake of illustration only, elements of a 3D printer that can be employed by the method of the present invention are provided in FIG. 2.

Specifically, FIG. 2 illustrates a 3D printer system 100 a 3D-printer 110 including canisters, cartridges, or containers 112A, 112B, and 112C comprising the different components to be printed onto a print bed 114. For example, the three containers 112A, 112B, and 112C can include a protein-based component P, a fat-based component F, and/or a blood substitute (water-based component) B, respectively.

The components within containers 112A, 112B, and 112C are dispended onto the print bed 114 via dedicated nozzles units 116A, 116B, and 116C. The different nozzle units are associated with motor driven ram/auger extruders 118A, 118B, and 118C.

Print bed 114 is disposed vertically below 3D-printer 110 and is aligned along a horizontal X-Y plane. Further, the 3D printer 110 is operable to move print bed 114 horizontally. FIG. 2 also illustrates that each nozzle unit 116A, 116B, and 116C comprises preceding elements 118A, 118B, and 118C configured to process the respective components prior to being expelled from the associated nozzles 116A, 116B, and 116C. while not specifically illustrated, elements 118A, 118B, and 118C can comprise extrusion elements operable by a motor (not illustrated) that applies pressure to push a ram, which, in turn, pushes the extruded component through a nozzle, preferably at a desired rate. Alternatively, the motor can may drive an Auger screw in order to directly push the extruded component through a nozzle, preferably at a desired rate. In other examples, the elements 118A, 118B, and 118C can independently include jet delivery units (e.g., piezo-electric based), progressive cavity pumps and/or powder dispensing units.

The 3D printer is operatively associated with a processor 120. It will be appreciated by those of skill in the art that processor 120 may be disposed solely within 3D-printer 110, solely outside 3D-printer 110 (e.g., in a remote or cloud-based system), or partially inside and partially outside 3D-printer 110. Processor 120 may be operatively associated with a print bed 114, which is optionally movable along a horizontal X-Y plane.

Print bed 114 may be a movable print bed positioned and driven so as to operatively move in all directions with respect to the nozzles. The different components within containers 112A, 112B, and 112C to be dispensed, for example, in one of the following modes:
  a) a continuous extrusion mode (strand by strand) in which the deposited line volume is controlled;
  b) a drop by drop mode in which the deposited drop volume may be controlled; and
  c) a mode combining the continuous mode and drop by drop modes.

Alternatively, the relative motion of the print bed 114 and the 3D printer 110 may be achieved, for any of the axes independently or collectively, by moving the 3D printer 110 rather than the print bed 114.

Nozzle units 116A, 116B, and 116C may, independently or collectively, alternatively constitute nozzle array rather than single nozzle, as to increase the throughput of the 3 printer 110.

In operation, apparatus 110 produces a 3D meat analogue 122 that includes a plurality of protein-based strands, such as strand 122, a plurality of fat-based strands, such as strand 124), and a plurality of water-based strand, such as strand 126.

Figures 3A, 3B:
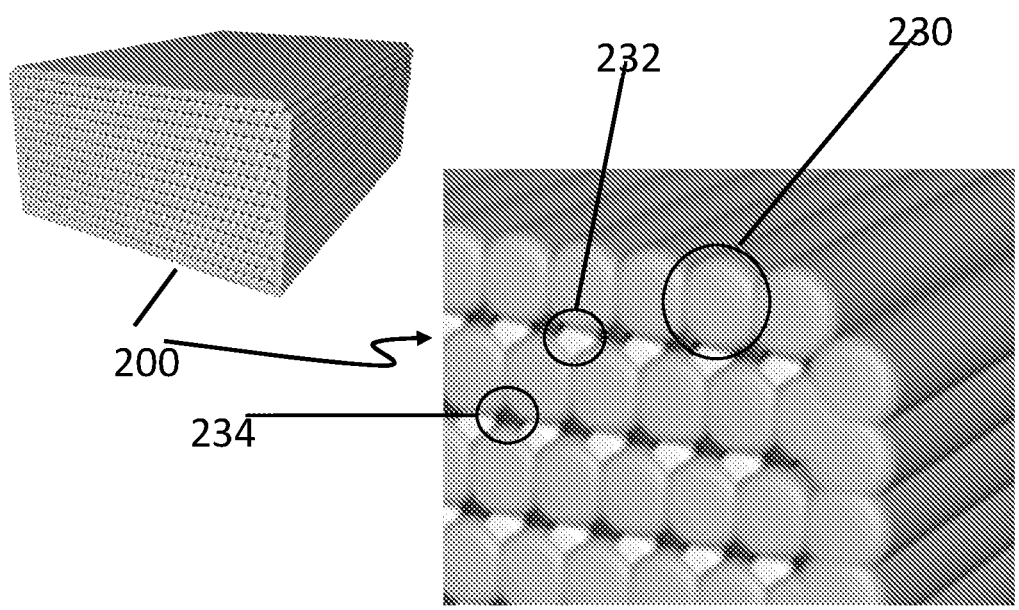
FIGS. 3A-3B provide schematic, cross-sectional views of a cubic sample of a 3D model of a meat analogue in accordance with one example of the present disclosure, with FIG. 3B being a magnified view of a segment of the 3D model of FIG. 3A.

Reference is now made to FIGS. 3A-3B which provide a schematic, cross-sectional view of a cubic sample of a 3D meat analogue 200, produced according to a first meat assembly plan (referred to below as Assembly Plan #1), in accordance with some examples of the present disclosure, FIG. 3B providing a magnified view of a segment of the 3D meat analogue of FIG. 3A.

FIGS. 3A and 3B show the 3D meat analogue 200 including a protein-based component disposed as a plurality of protein-containing units 230, a fat-containing component disposed as a plurality of fat-containing units 232, and a water-containing component disposed as a plurality of water-containing units 234.

Figure 4A:
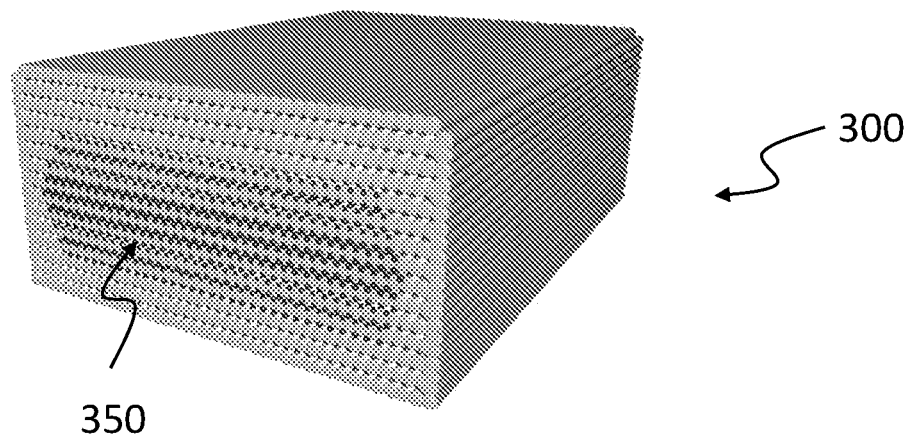
FIGS. 4A-4B provide a schematic, cross-sectional view of a cubic sample of a 3D model of a meat analogue in accordance with another example of the present disclosure, with FIG. 4B providing a magnified view of a segment of the 3D model of FIG. 4A.
Figure 4B:
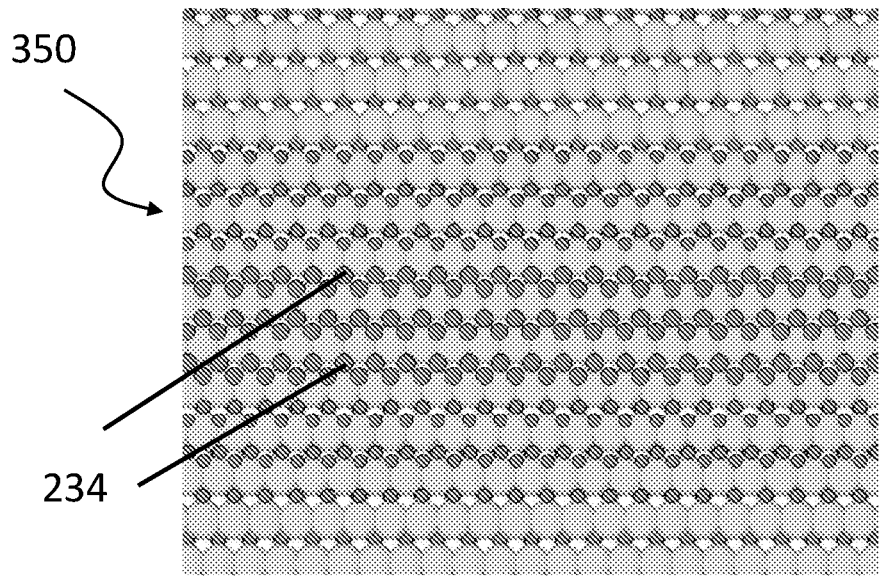

Reference is now made to FIGS. 4A and 4B which provide a schematic, cross-sectional view of a cubic sample of a 3D meat analogue 300, produced according to a second meat assembly plan (referred to below as Assembly Plan #2), in accordance with some other examples of the present disclosure, FIG. 4B providing a magnified view of a segment of the 3D meat analogue of FIG. 4A.

For simplicity, like reference numerals to those used in FIGS. 3A-3B, shifted by 100 are used to identify components having a similar function. For example, element 330 in FIG. 4A is a protein containing unit having the same function as protein containing unit 230 in FIG. 3A.

Specifically, FIG. 4A illustrates a high concentration of water based components 234 in the center area 350 of meat analogue 300. By way of example, such an assembly plan would provide the mouthfeel of a juicy steak when cut away accordingly from the slab 300.

Figure 5A:
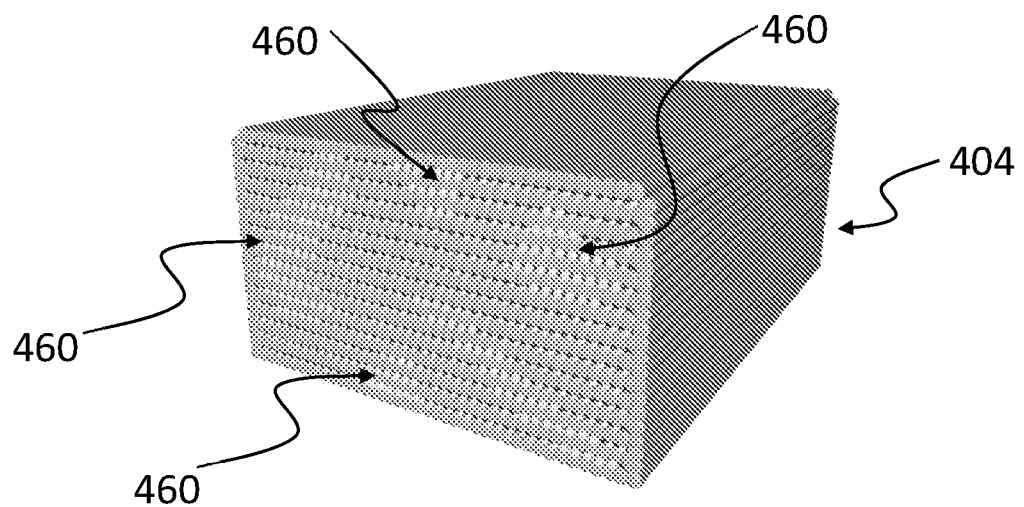
FIGS. 5A-5B provide a schematic, cross-sectional view of a cubic sample of a 3D model of a meat analogue in accordance with yet another example of the present disclosure, with FIG. 5B providing a magnified view of a segment of the 3D model of FIG. 5A FIGS. 6A-6Z provide schematic illustrations of possible printing configurations of meat analogues in accordance with some examples of the present disclosure, where circles indicate the center of a printed component material.
Figure 5B:
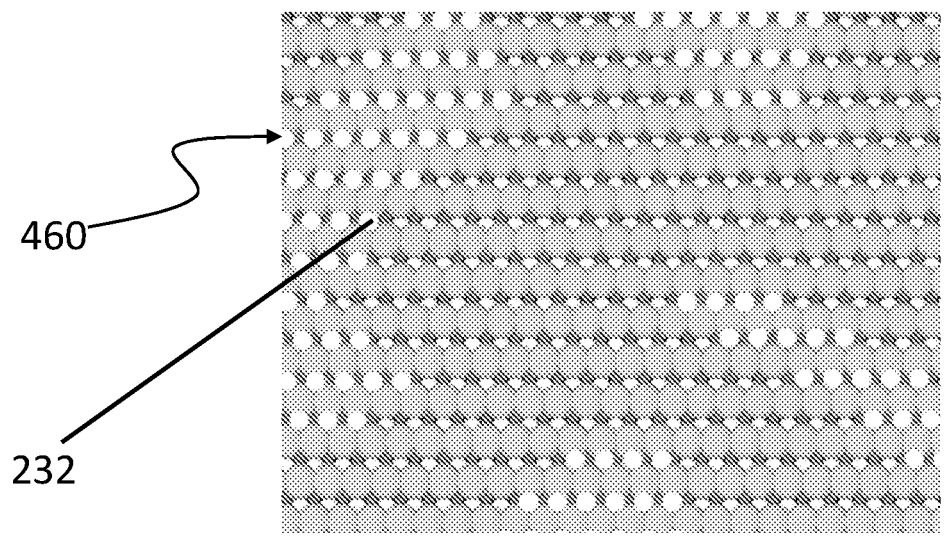

Reference is now made to FIGS. 5A-5B providing a schematic, cross-sectional illustration of another 3D meat analogue 400, produced according to a third assembly plan (Assembly Plan #3), in accordance with other examples of the present disclosure, where FIG. 5B provides a magnified view of a portion of the meat analogue of FIG. 5A.

Specifically, FIGS. 5A-5B show that the meat analogue 400 comprises a relatively high concentration of fat containing units 232 in various segments 460 of meat analogue 400. By way of example, the formation of fat rich segments can provide a mouthfeel of a steak having pockets of fat, also termed fat marbling.

Figure 6A:
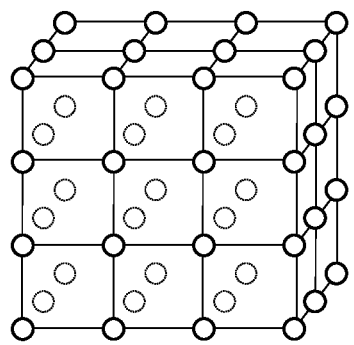
Figure 6B:
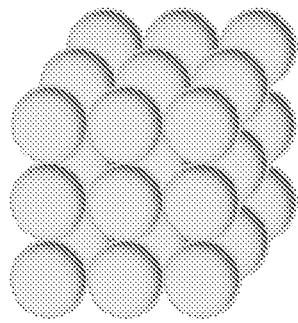
Figure 6C:
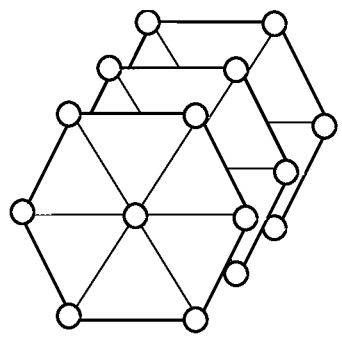
Figure 6D:
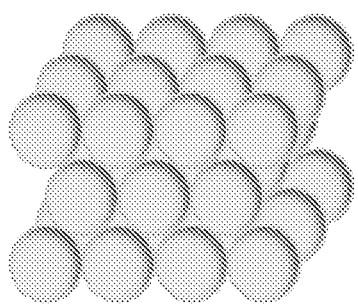
Figure 6E:
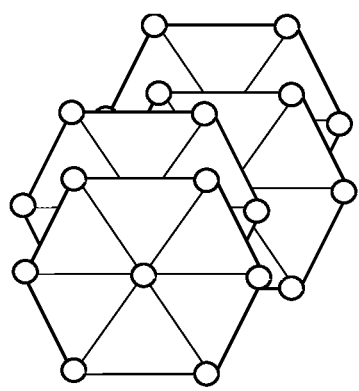
Figure 6F:
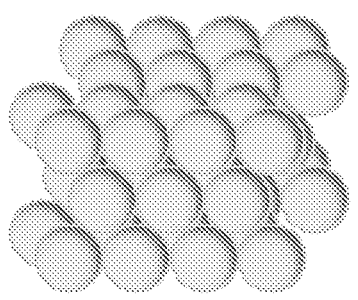
Figure 6G:
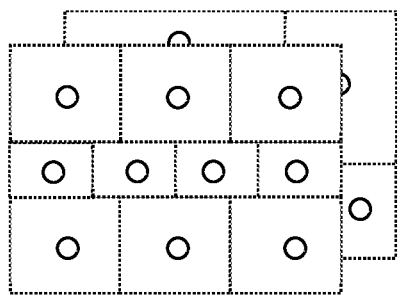
Figure 6H:
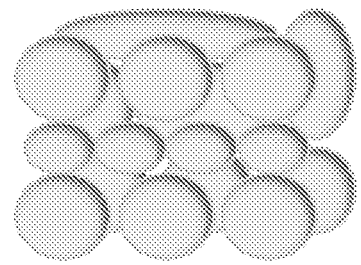
Figure 6I:
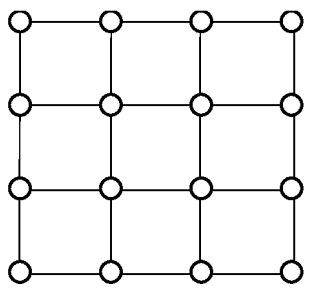
Figure 6J:
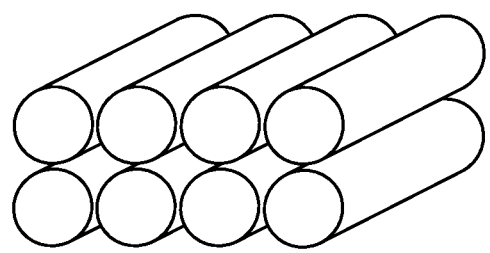
Figure 6K:
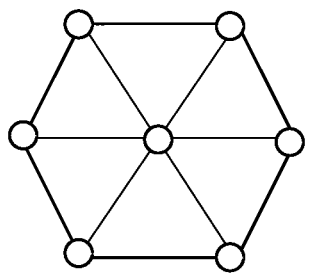
Figure 6L:
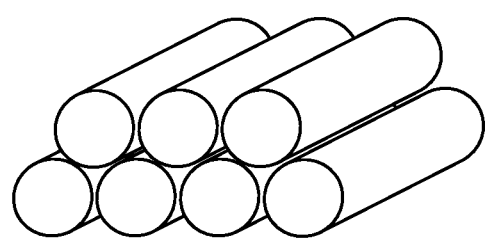
Figure 6M:
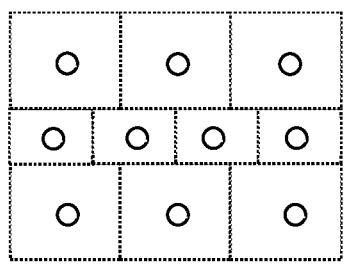
Figure 6N:
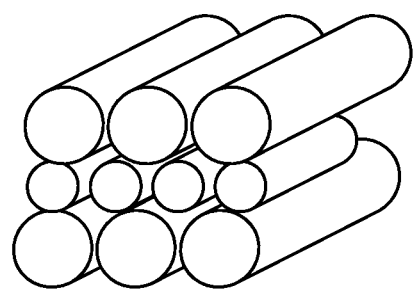
Figure 6O:
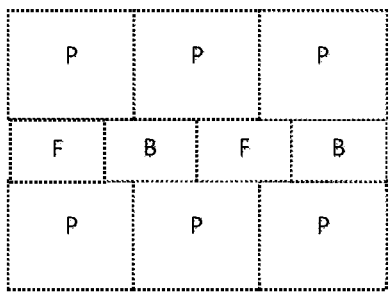
Figure 6P:
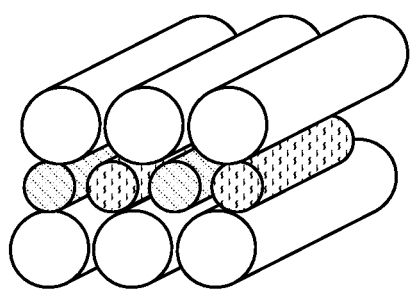
Figure 6Q:
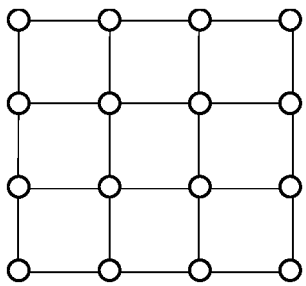
Figure 6R:
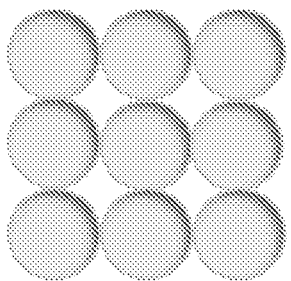
Figure 6S:
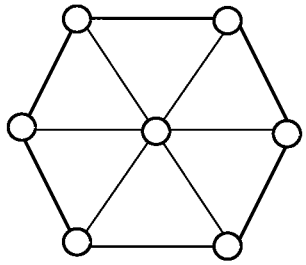
Figure 6T:
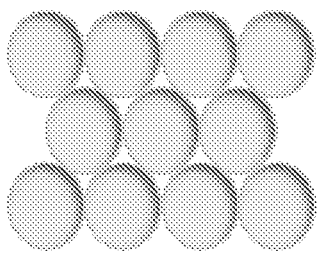
Figure 6U:
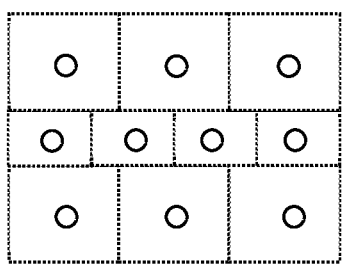
Figure 6V:
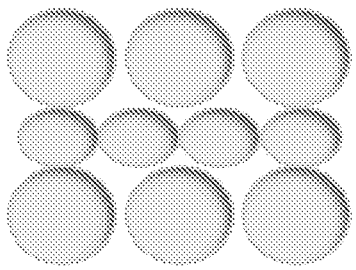
Figure 6W:
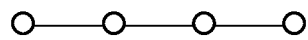
Figure 6X:
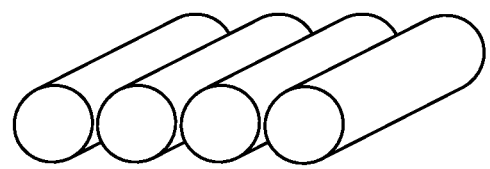
Figure 6Y:
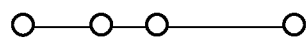
Figure 6Z:
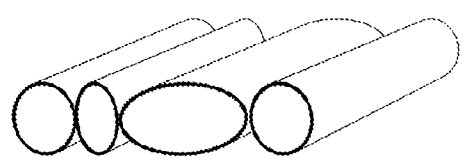

Turning now to FIGS. 6A-6Z, these provide schematic illustrations of possible printing configurations of meat analogues in accordance with some examples of the present disclosure.

FIGS. 6A-6Z provide illustrations of print positions where circles indicate the center of a printed component material.

FIGS. 6A-6Z illustrate layers of different spatial dimensions (1D, 2D and 3D). It is to be appreciated that this is for the purpose of illustrating the fact that not only the shape of the printed material can be controlled but also the dimensions thereof. As illustrated, a material can be printed as a continuous strand occupying a volume that is greater or smaller than the volume occupied by a strand of another printed material, and the two printed materials can both be a protein based material, can be both a fat based material or can belong to different types of components, e.g. one being a protein based component, the other being the fat or water based component.

Although FIGS. 6A-6Z can illustrare a periodic arrangement of components in the assembly plan, an artibtrary, non-periodic assembly plan is possible just as well. Further, while cylindrical and elliptical cylinder printed material are illustrated, the printed material may be in any form, generally prism, like cuboid, hexagon prism, cylinder, elliptical cylinder, etc.

While not specifically illustrated, it is to be noted that the meat analogue can include voids, namely, areas where no material was printed.

The meat alternative matrix assembly plan is prepared by constructing a detailed list of data points describing the different combinations of protein component, fat component and moisture component in each layer, as well as the different order in which layers are assembled one on top on the other. The execution of the assembly plan is performed using a computer program capable of creating complex 3D models according to the desired assembly plan, and then use slicing software as known in the art to create a final file containing all of the data in the meat assembly plan. The meat analogue assembly plan is typically digital, provided in a digital file with a format such as txt, xml, html or others. In some cases, the meat analogue assembly plan can be a human language file, or a computer readable language.

In some examples, the assembly plan is represented as at least one of a digital file, a txt file, an XML file, a CAD file, a 3DS file, a STL file, an OBJ file, or a g-code file.

In some cases, the assembly plan is a digital 3D model file utilizing known industrial modeling tools format such as Solidworks or CAD.

In some examples, the assembly plan is a 3D model file, transformed by additional software to control the system list of operations. One non-limiting example can be an STL 3D model file, transformed by 3D slicing software into a G-Code format file uploaded to a 3D printer.

In some examples, the meat analogue is printed using two 3D printers.

In some examples, the 3D printer comprises two or more printer heads/deposition heads, so as to enable the deposition of different components without the need to replace the cartridge/syringe providing the printed component. In some examples, the use of a 3D printer with two or more printer heads allows the simultaneous printing of different components, possibly without cross-interreference between the printing of different components.

In some examples, more than a single slab can be printed simultaneously, in order to enlarge the throughput of the 3D printer.

The components to be dispensed can be loaded to syringes of different sizes, or syringes compatible with adjustable tips (e.g. Luer-Lok™). Each syringe can be loaded onto a separate printing station, with a deposition mechanism comprising of a motor, control unit and an adjustable rod as typically available with 3D printers. The printer processor is able to control the deposition rate of each syringe by the speed of movement in the motor, allowing for different amounts of component material to pass through the nozzle, or in combination with the print-bed motor movement, create different width of strands from a single nozzle size.

The operation and equipment to be used for relevant printer head can be adjusted or specifically selected based on the component to be dispensed therethrough, e.g. based on the viscosity or consistency of the component. For example, different motors and different gears can be introduced to provide stronger forces on the extruding ram/auger screw/progressive cavity pump, so as to enable flow of high-viscosity materials.

In addition, existing 3D printers can be redesigned to include larger deposition syringes or canisters, for example, vessels made of food-grade stainless steel having a capacity of at least 60 ml, at least 80 ml, at least 100 ml, at least 120 ml, or more.

Heating elements can be installed on such cartridges/syringes to affect texture and/or fluidity of the dispensed material. By way of example, heating can cause some level of denaturation of the protein component in situ, or may allow for the adjustment of viscosity in any of the fat, moisture, and protein components.

In the following, the spatial dimension of a meat analogue as disclosed herein is discussed in general terms, to show several possible configurations by which the different components forming it can be spatially arranged to form the meat alternative disclosed herein. Generally, the printing of multi-layered meat analogues as disclosed herein can be conducted as a 2D continuous matrix assembly plan or a 3D non-continuous matrix assembly plan. Printing of single layer meat analogues as disclosed herein can be conducted as a 2D non-continuous matrix assembly plan or 1D continuous assembly plan. Continuous as used herein refers to a situation in which a single component is used for continuously printing along a certain dimension.

Two (2)-dimensional continuous matrix assembly plan is one example with respect to spatial dimension. In this example, a 2D pattern is divided into "2D cells" where each cell indicates a continuous printing of a certain component (or void left unprinted) in a direction perpendicular to the 2D pattern and its constituents cells, thereby creating a complete 3D model/meat analogue (for example, printing a protein strand). See in this connection FIGS. 6I-6P. FIGS. 6J, 6L, 6N and 6P illustrate the full 3D meat analogue, while FIGS. 6I, 6K, 6M and 6O illustrate their corresponding cross-section, the circles/letters representing the center of deposited component.

It is noted that in 3D printing terminology, voxels (volume pixels) in this case are actually 2D (or "2.5D"), with the $3^{rd}$ dimension being degenerated along the print direction. Notably, a 2D (or "2.5D") cell can represent printed component as well as a void (i.e. where no material has been printed).

The 2D cells can be presented in any form, like square (See FIGS. 6I-6J), rectangular or hexagonal (See FIGS. 6K-6L). Generally speaking, hexagonal presentation exhibits 6 contact points with neighboring cells (in contrast to 4 contact points in square/rectangular cells), providing better structural stability and higher filing ratio (smaller voids between cells). Deposited strands may possess similar diameter/cross-section size, or different diameter as shown for example in FIGS. 6M-6N. The dashed line in FIG. 6M is only for the purpose of illustrating possible printed material dimension.

Deposited strands may be of similar components, or different components as shown for example in FIGS. 6O-6P, illustrating protein-, fat- and water-based (blood) components.

Three (3)-dimensional meat matrix assembly plan is another example with respect to spatial dimensions of the meat analogue. In this example, no continuity is assumed along any direction (including the printing direction) so, the basic cell of the assembly plan is defined in three dimensions rather than in two dimensions as in the previous example, known in the art as voxel (full 3D cell). See in this connection FIGS. 6A-6H.

The 3D cells can be arranged with respect to each other in any form, like square (See FIGS. 6A-6B), rectangular or hexagonal (See FIGS. 6C-6F).

The 3D cell may exhibit arbitrary shape and dimensions of the printed component (FIG. 6H). The dashed line in FIG. 6G is only for the purpose of illustrating possible printed material dimension.

In one example, yet without being limited thereto, the 3D cells are arranged in discrete height positions, where each discrete height position indicates a printed layer. Notably, a 3D cell can represent printed component as well as a void (i.e. where no material has been printed).

One (1)-dimensional continuous vector assembly plan for single layer product. In such vector, the defined assembly plan has one dimension (contains 1D cells), where each 1D cell indicates a continuous printing of the material to be printed (including no print/void option) in a direction perpendicular to vector plain-along the layer (for example, printing a protein strand). See in this connection FIGS. 6W-6Z.

Again, FIGS. 6Y-6Z shows different distances between strands, and strands of different cross-section size and shape.

Two (2)-dimensional meat matrix assembly plan for single layer product. In such matrix the material to be printed (including no print option) is defined in each pre-defined 2D cell. The 2D cells may be order in any form, like square (FIG. 6Q-6R), rectangular, hexagonal (FIG. 6S-6T), or any other form (FIGS. 6U-6V).

Although some of the FIGS. 6A-6Z provided herein illustrate a periodic arrangement of components in the assembly plan, an arbitrary, non-periodic assembly plan is possible just as well for all dimensional categories discussed above.

Further, while cylindrical and elliptical cylinder printed material are illustrated, the printed material may be in any form, generally prism, like cuboid, hexagon prism, cylinder, elliptical cylinder, etc. this holds true for all dimensional categories discussed above.

FIGS. 7A-7F provide illustrations of 3D printing models in accordance with some non-limiting examples of the present disclosure.

Figure 7A:
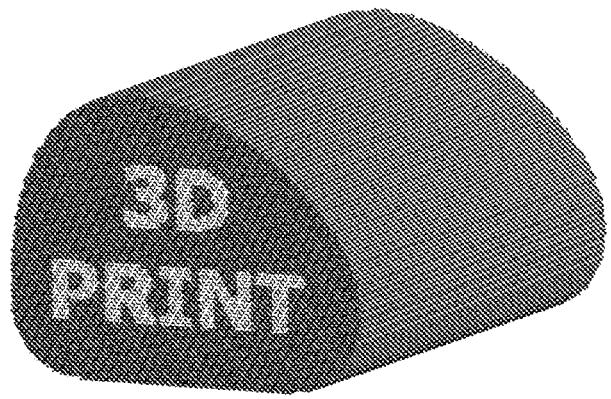
FIGS. 7A-7F provide illustration of different 3D printing models according to various non-limiting examples of the present disclosure.

FIG. 7A illustrates a meat alternative slab including text printed making use of the fat containing component which is being printed as a text within the protein based component. See in this connection also Example 12 herein below.

Figure 7B:
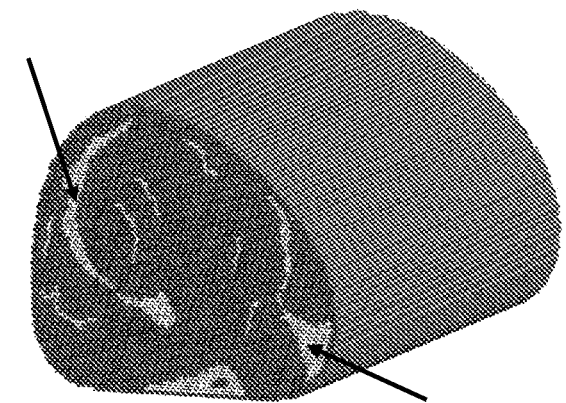
Figure 7C:
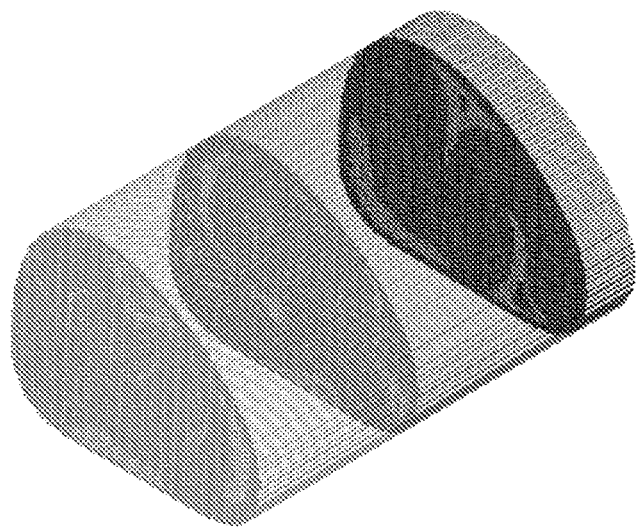

FIG. 7B provides an illustration of a meat alternative slab including fat marbling (indicated by some examplary arrows) which is changed along the slab's length, as evident from the illustrated cross-section views provided in FIG. 7C.

Figure 7D:
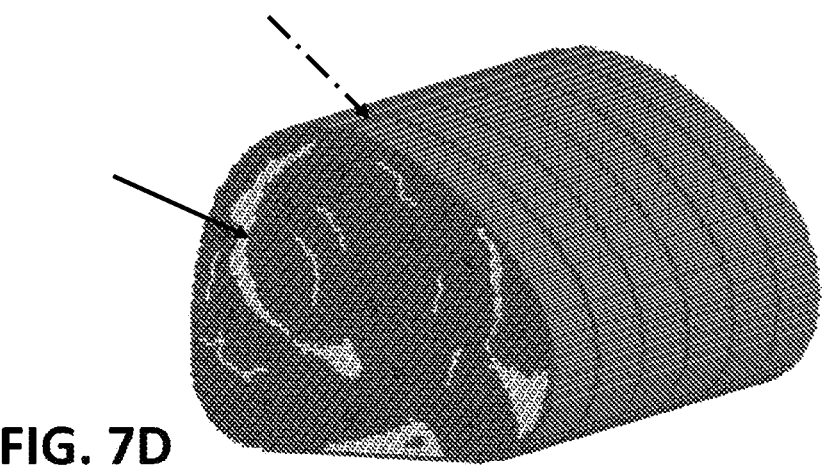
Figures 7E, 7F:
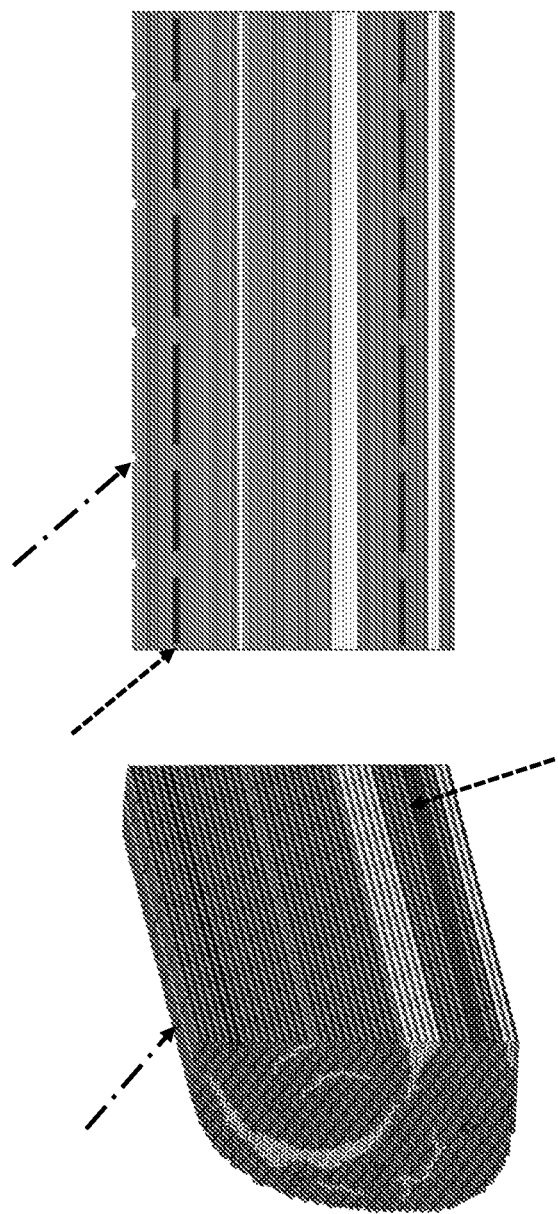

FIGS. 7D-7F provide an illustration of a meat alternative slab including fat marbling (indicated by one examplary complete arrow) yet with the addition of pockets of blood (illustrated by one examplary dotted arrow) and cutting lines for guiding the slicing of the steaks (illustrated by one examplary dashed arrow).

As used herein, the forms "a", "an" and "the" include singular as well as plural references unless the context clearly dictates otherwise. For example, the term "a protein based component" includes one or more components of differnet protein composition which are capable of forming a protein based segment within the meat analogue.

Further, as used herein, the term "comprising" is intended to mean that, for example, a component, e.g. a protein based components includes the recited protein, but not excluding other substances including othe proteins. The term "consisting essentially of" is used to define, for example, compoents which include the recited substances but exclude other substances that may have an essential significance on the characteristics of the resulting meat analogue. "Consisting of" shall thus mean excluding more than trace amounts of other elements. Embodiments defined by each of these transition terms are within the scope of this disclosure.

Further, all numerical values, e.g. when referring to the amounts or ranges of the elements constituting the component disclosed herein, are approximations which are varied (+) or (−) by up to 20%, at times by up to 10% of from the stated values. It is to be understood, even if not always explicitly stated that all numerical designations are preceded by the term "about".

Further, as used herein, the term "percent", or "%", refers to percent by weight, unless specifically indicated otherwise.

The invention will now be exemplified in the following description of experiments that were carried out in accordance with the invention. It is to be understood that these examples are intended to be in the nature of illustration rather than of limitation. Obviously, many modifications and variations of these examples are possible in light of the above teaching. It is therefore, to be understood that within the scope of the appended claims, the invention may be practiced otherwise, in a myriad of possible ways, than as specifically described hereinbelow.

NON-LIMITING EXAMPLES

Example 1—Preparation And Testing Of Meat Analogue #1

Components Preparation

Three components were separately prepared, the protein-based component (P), the fat-based component (F) and the aqueous component (W).

The indicated percentages of the protein and/or fat in the resulting components were calculated according to the ingredients used.

Protein Component:

The protein containing component in powder form was prepared by mixing the dry ingredients of Table 2A, in a Ninja® BL862 Kitchen System mixer, at maximum device speed 10,000 RPM, for 10 minutes. A total of 1000 gr dry powder was obtained.

TABLE 2A

Protein Component

| Ingredient | Amount (grams) |
|---|---|
| Vital Wheat Gluten (Roquette) | 300 |
| Pea protein (Roquette) | 180 |
| Potato protein isolate (Avebe) | 120 |
| Xanthan gum (CP kelco) | 3 |
| Modified starch | 93 |
| Coconut Oil | 86 |
| Yeast extract powder | 43 |
| Dried vegetable and mushroom powder | 50 |
| Table Salt | 29 |
| Beet coloring powder | 20 |
| Dietary fibers (Interfiber) | 76 |
| Total | 1000 |

To obtain a protein dough, the dry protein-based components were mixed with 1000 grams of water in the same mixer for 5 minutes.

The resulting mass had the consistency of dough and a bright red color resembling bovine meat (beef).

The protein % (WB) in this component is: 24.66%

Fat Component

Palm oil was stirred with 1.5% monoglyceride and diglyceride, at 65° C. The mixture was then transferred through a scraped surface heat exchanger (17-28° C.), following a pass through an agitator. The mixture was then extruded and tempered at 25° C. for 24 hours. The resulting mixture was a solidified vegetable shortening.

The fat % (WB) in this component is: 100%

Water/Blood Substitute Component

To create a blood substitute providing flavor, juiciness and rich mouthfeel, the dry powders from the following Table 2B were mixed thoroughly with water (same mixer as for the protein component) until a clear, red liquid was obtained.

TABLE 2B

Water component

| Ingredient | Amount (grams) |
|---|---|
| modified starch | 78 |
| Beet coloring powder | 20 |
| Maltodextrin | 102 |
| Water | 800 |
| Total | 1000 |

The blood substitute component mixture was then heated to 70° C. for 15 minutes until a gel was formed.

The percentage of protein and fat in the meat analogue #1 was on a wet basis
Protein: 19.12% wb
Fat: 16.1% wb
Carbohydrates: 12.14% wb Assembly Plan #1 of Meat Analogue #1
  A cross sectional cut of a 3D Assembly Plan of a meat analogue #1 produced from the above three components is illustrated in the below Table 2C.
  The 3D Assembly Plan #1 defines meat analogue #1 comprising a total of 10 layers, in which M represents muscle sections comprising the protein-based component, F represents the sections comprising the fat component and B represents blood sections comprising the water (blood substitute) component.

TABLE 2C

Cross Section of 3D assembly plan#1

| Layer | Component |
|---|---|
| 1 | MMMMMMMMMMMM |
| 2 | MFFFFFFFFFFFFFFFM |
| 3 | MBBBBBBBBBBBBBM |
| 4 | MMMMMMMMMMMM |
| 5 | MFFFFFFFFFFFFFFFM |
| 6 | MBBBBBBBBBBBBBM |
| 7 | MMMMMMMMMMMM |
| 8 | MFFFFFFFFFFFFFFFM |
| 9 | MBBBBBBBBBBBBBM |
| 10 | MMMMMMMMMMMM |

According to the 3D Assembly Plan #1, the protein-based component was loaded into a 60 centiliter (cl) syringe equipped with 5 mm nozzle and the fat component and water component were each loaded into a dedicated 60 cl syringe equipped with a 1 mm nozzle (Luer-Lok™ tips). The dispensing of the different components was conducted manually according to the 3D Assembly Plan #1 in a room temperature of 19° C. The resulting meat analogue slab was then vacuum-sealed and stored in a refrigerator for 5 hours. The meat analogue was then cooked in an immersion bath for 3 hours at 70° C.

Results and Analysis

The meat analogue #1 of Assembly Plan #1 was analyzed using a Lloyd™ Texture analyzer system TA1 with 1 kN LC head (test conditions described hereinabove) and compared with other meat analogues available in the market, as well as with several bovine meat cuts (beef).

The results indicated that meat analogue according to meat analogue #1 was similar to beef meat in several key textural parameters, including hardness and gumminess (e.g., as characterized by hardness cohesiveness) (data not shown).

In addition, a cut (approximately 200 gram) was fried for 7 minutes on a pan with 1 tablespoon (approximately 13 grams) of vegetable oil. The fried preparation was served with a commercially available gravy and was considered to resemble a steak.

Example 2—Preparation and Testing of a Meat Analogue #2

Components Preparation

For the preparation of a second meat analogue (#2), three components were separately prepared, the protein component (P), the fat component (F) and the water component (W).

Protein Component

The protein containing component in powder form was prepared by mixing the dry ingredients of Table 3A below, in a Ninja® BL862 Kitchen System mixer, at maximum device speed 10,000 RPM, for 10 minutes. A total of 50 grams powder was obtained.

TABLE 3A

Protein-based Component

| Ingredient | Amount (grams) |
|---|---|
| Vital Wheat Gluten (Roquette) | 14.6 |
| Pea protein isolate (Roquette) | 8.8 |
| Potato protein isolate (Avebe) | 5.8 |
| Xanthan gum (CP kelco) | 0.1 |
| Modified starch | 5.0 |
| Coconut Oil | 10.0 |
| Yeast extract powder | 1.0 |
| Table salt | 1.0 |
| Beet Coloring powder | 1.0 |
| Dietary fibers (Interfiber) | 12.7 |
| Total | 50.0 |

The powder (all 50 gr) was then mixed with 100 gram of water for 5 minutes using the Ninja® Kitchen System Mixer. A commercial transglutaminase enzyme powder (8 grams, Activa® TI) was then added to the liquid mixture and incubated at 37° C., 200 rpm shaking for 1 hour during which crosslinking took place, which resulted in a gel-like protein component.

The protein % (WB) in this component was: 15.77%:

Fat-Based Component

A commercially available Palm Oil Shortening was used, As Is, as an animal fat substitute (Spectrum Naturals, Organic All-Vegetable Shortening).

The fat % (WB) in this component was: 100%

Aqueous Component

To create the aqueous based component (regarded as a blood substitute), the dry powders detailed

TABLE 3B

Aqueous component

| Ingredient | Amount (grams) |
|---|---|
| modified starch | 2 |
| Beet coloring powder | 2 |
| Carrageenan (CP kelco) | 1 |
| Water | 20 |
| Total | 25 |

The combination of ingredients was mixed in Thermomix mixer at 79° C. for 10 minutes until a gel was formed.

The percentage of protein and fat in the meat analogue #2 was:

Protein: 12.65% wb

Fat: 17.44% wb

Carbohydrates: 7.38% wb

Assembly Plan #2 of Meat Analogue #2

A 3D Assembly Plan #2 was prepared using Solidworks modeling software, as presented in FIG. 3A. The 3D Assembly Plan #2 was loaded to a Hy-Rel SR30 3D printer, and sliced with Slic3r software.

According to 3D Assembly Plan #2 the protein component was loaded into a 60 cc syringe having a 2 mm equipped with Luer-Lok™ tip, the fat and moisture components were loaded into a 60 cc syringe equipped, each, with a 0.5 mm Luer-Lok™ tip.

The components were printed using the Hy-Rel SR30 printer, resulting in a meat analogue #2. The meat analogue #2 was then vacuum-sealed and then cooked by immersion in a water bath set at 75° C.

Results and Analysis

The meat analogue of Assembly Plan #2 was fried (after said Sous-vide at 75° C.) for 2 minutes on a pan with 1 tablespoon (approximately 13 grams) of vegetable oil. The fried preparation was served with a commercially available gravy. The result was a meat-like dish resembling steak.

Example 3—Preparation and Testing of Meat Analogue #3 According to Assembly Plan #3

Components Preparation

Three components were separately prepared, the protein-based component (P), the fat component (F) and the water/aqueous component (W).

Protein Component:

Similar to meat analogue of Assembly Plan #1, the protein-based component, in powder form, was prepared by mixing the dry ingredients of Table 4A, in a Ninja® BL862 Kitchen System mixer, at maximum device speed 10,000 RPM, for 10 minutes. A total of 1000 gr dry powder was obtained.

TABLE 4A

| Protein Component | |
|---|---|
| Ingredient | Amount (grams) |
| Soy protein (Solae) | 300 |
| Pea protein concentrate (Roquette) | 180 |
| Potato protein isolate (Avebe) | 120 |
| Xanthan gum (CP kelco) | 3 |
| Modified starch | 93 |
| Palm Oil | 86 |
| Yeast extract powder | 43 |
| Dried vegetable and mushroom powder | 50 |
| Table Salt | 29 |
| Beet coloring powder | 20 |
| Dietary fibers (Interfiber) | 76 |
| Total | 1000 |

To obtain a protein dough, the above components were mixed with water (1000 ml) and mixing continued for 10 minutes at a 5000 rpm. An amount of 100 ml of the resulting protein-component was loaded into a stainless steel tube equipped with a 2 mm Luer-Lok™ tip.

The protein % (WB) in this component was: 26.8%

Fat Component:

Vegetable oil (a mixture of palm, coconut, and rice bran oils) was solidified (nucleation followed by crystal growth) to create a vegetable shortening. The oil was mixed with 1.5% mono and diglycerides at 65° C., with continuous stirring. The mixture was then transferred through a scraped surface heat exchanger (17-28° C.), following a pass through an agitator. The mixture was then extruded and tempered at 25° C. for 24 hours.

The shortening produced was loaded into a 60 cc syringe having a 0.5 mm Luer-Lok™ tip, for extruding by means of 3D printing.

The fat % (WB) in this component was: 100%

Water Component

With regard to the water or moisture containing component (or blood substitute), dry powders from Table 4B were mixed thoroughly with water to obtain a clear, red liquid.

TABLE 4B

| Water component | |
|---|---|
| Ingredient | Amount (grams) |
| modified starch | 78 |
| Natural coloring powder | 20 |
| Maltodextrin | 102 |
| Water | 800 |
| Total | 1000 |

Commercial beef flavor preparations were mixed into the blood substitute formulation, delivering water-soluble flavors to the final meat analogue.

The water or moisture containing component was loaded into a 60 cc syringe having a 0.5 mm Luer-Lok™ tip, for extruding by means of 3D printing (with no additional heating), with the appropriate proportion in the final meat analogue as dictated by a pre-determined meat assembly plan described below.

The percentage of protein and fat in the meat analogue #3 was as follows:
Protein: 21.45% wb
Fat: 15.43% wb
Carbohydrates: 6.66% wb Meat Analogue Assembly Plan #3

A 3D Assembly Plan #3 was prepared using Solidworks modeling software. The 3D Assembly Plan #3 was loaded to a Hy-Rel SR30 3D printer, and sliced with Slic3r software.

The protein-containing component was heated to 80° C. during the dispensing.

Results and Analysis

The final meat analogue #3 was then tested utilizing a standard cooking process consisting of frying for 2 minutes on a pan with 1 tablespoon (approximately 13 grams) of vegetable oil. The fried preparation was served with a commercially available gravy. The result was a meat-like dish resembling steak.

Example 4—Preparation and Testing of Meat Analogue According to Assembly Plan #4

Protein-Based Component 1000 gram of the following powder mix was prepared by mixing the dry ingredients of Table 5A in the Ninja® Kitchen System mixer for 10 minutes.

TABLE 5A

| Protein Component | |
|---|---|
| Ingredient | Amount (grams) |
| Vital Wheat Gluten (Roquette) | 300 |
| Pea protein isolate (Roquette) | 180 |
| Potato protein powder (AVEBE) | 120 |
| Xanthan gum | 3 |
| Modified starch | 93 |
| Coconut Oil | 86 |
| Yeast extract powder | 43 |
| Natural flavors | 50 |
| Table Salt | 29 |
| Red natural color powder | 15 |
| Black natural color powder | 5 |
| Dietary fibers (Interfiber) | 76 |
| Total | 1000 |

The mixture was then mixed for 10 minutes with 1,500 ml water (to achieve a 60% water content) to obtain a wet, high-moisture dough.

The protein % (WB) in this component was: 19.84%

Aqueous-Based Component

Dry powders from Table 5B were mixed thoroughly with water to obtain a clear, red liquid.

TABLE 5B

| Aqueous Components | |
|---|---|
| Ingredient | Amount (grams) |
| modified starch | 78 |
| Beet coloring powder | 20 |
| Maltodextrin | 102 |
| Water | 800 |
| Total | 1000 |

The aqueous based component, acting as a blood substitute mixture was heated to 80° C. for 10 minutes, to achieve a firm gel.

Fat-Containing Component

A commercially available red palm and coconut shortening was used as an animal fat substitute (Nutiva). Subsequently, commercially available beef flavor were mixed into the fat substitute formulation, delivering fat-soluble flavors to the final meat analogue.

The fat % (wb) in this component was: 100%

The percentage of protein and fat in the meat analogue #3 was:

Protein: 15.88% wb
Fat: 15.36% wb
Carbohydrates: 8.63% wb

Meat Assembly Plan #4

A 3D model was prepared using Solidworks modeling software according to the plan provided in FIG. 5A-5B. The 3D model was loaded to a Hy-Rel SR30 3D printer, and sliced with Slic3r software.

The protein extrudate was transferred into a stainless steel syringe compatible with the Hy-Rel 3D printer KR2 high viscosity printing module, equipped with a 2 mm tip and set to 70° C. while printing.

The fat and water based components were loaded into a 60 cc syringe using a 0.5 mm Luer-Lok™ tip.

The meat analogue was printed using a Hy-Rel SR30 printer according to the assembly plan #4. The meat-analogue matrix obtained was then tested utilizing a standard cooking process consisting of frying for 2 minutes on a pan with 1 tablespoon (approximately 13 grams) of vegetable oil. The fried preparation was served with a commercially available gravy. Based on sensorial evaluations, it was concluded that the fried preparation was a meat-like dish resembling steak.

Example 5—Preparation and Testing of Meat Analogue #5 According to Assembly Plan #5

Protein-Containing Component 1000 gram of the following powder mix was prepared by mixing the dry ingredients of Table 6A in the Ninja® Kitchen System mixer for 10 minutes.

TABLE 6A

| Protein Components | |
| --- | --- |
| Ingredient | amount (gram) |
| Soy Protein Isolate (Solae) | 600 |
| Methylcellulose (Methocel, DOW) | 3 |
| Modified starch | 93 |
| Red Palm Oil | 86 |
| Yeast extract powder | 43 |
| Dried vegetable and mushroom powder | 50 |
| Table Salt | 29 |
| Beet red coloring powder | 20 |
| Dietary fibers (Interfiber) | 76 |
| Total | 1000 |

Subsequently, the powder mix was mixed, in a mixer, along with 1,000 grams of water. The resulting mass was fed into a Thermomix mixer in which heating and mixing steps are carried out and thermal conditions of 55° C. combined with shear stress are applied for 10 minutes.

The protein % (WB) in this component is: 27.4%

Moisture-Containing Component

Dry powders from Table 6B were mixed thoroughly with the water to obtain a clear, red liquid.

TABLE 6B

| Water based Component | |
| --- | --- |
| Ingredient | Amount (grams) |
| modified starch | 78 |
| Beet coloring powder | 20 |
| Maltodextrin | 102 |
| Water | 800 |
| Total | 1000 |

After forming a gel, substantially as described hereinabove, the gel was extruded from the system in the appropriate proportion and position, according to the predetermined assembly plan described below.

Fat-Containing Component

As for the fat containing component, 150 g of ethyl cellulose and 1400 g of vegetable oil are mixed while nitrogen flows through a reaction vessel to create a nitrogen environment. Subsequently, the mixture is heated to 150° C. and stirred for 60 minutes. The solution is then cooled to 25° C., while maintaining a continuous flow of nitrogen throughout the mixing and cooling process. The result was a stable oleogel.

The fat % (WB) in this component is: 90.3%

Meat Analogue #5 According to Assembly Plan #5

A 3D model was prepared using Solidworks modeling software as provided in FIG. 5A-5B. The 3D model was loaded to a Hy-Rel SR30 3D printer and sliced with Slic3r software. The protein extrudate was transferred into a stainless-steel syringe compatible with the Hy-Rel 3D printer KR2 high viscosity printing module, equipped with a 2 mm tip and set to 70° C. while printing. The moisture containing component is then fed into a 15 ml stainless steel tube provided in a Hy-rel KR2 printing head. The tube is equipped with a 0.5 mm Luer-Lok™ tip. Within the nozzle, the preparation is heated to 70° C. for 5 minutes, to form a gel.

The fat and water/moisture containing components were loaded into a 60 cc syringe having a 0.5 mm Luer-Lok™ tip. The components were printed using a Hy-Rel SR30 printer, to produce the meat analogue.

Example 6—Preparation and Testing of Meat Analogue #6 According to Assembly Plan #6

Protein-Containing Component 50 grams of the powder mix of Table 7A were prepared by mixing the dry ingredients in the Ninja® Kitchen System mixer for 10 minutes.

TABLE 7A

| protein component | |
| --- | --- |
| Ingredient | Amount (grams) |
| Vital Wheat Gluten (Roquette) | 14.6 |
| Pea protein isolate (Roquette) | 8.8 |
| Potato protein isolate (Avebe) | 5.8 |
| Xanthan gum | 0.1 |
| Modified starch | 5.0 |
| Coconut Oil | 10.0 |
| Yeast extract powder | 1.0 |
| Table salt | 1.0 |
| Annatto Coloring powder | 1.0 |
| Dietary fibers (Interfiber) | 2.7 |
| Total | 50.0 |

Then, 50 grams of the powder were mixed with 100 grams of water for 5 minutes using the Ninja® Kitchen System mixer. 10 grams of a dry cross-linking enzyme powder was added to the mixture and incubated at 37° C., with 200 rpm shaking, for 1 hour.

The mixture underwent a crosslinking reaction, which resulted in a gel-like matrix.

The protein % (WB) in this component was: 15.75%

Water-Containing Component

Dry powders from the Table 7B were mixed thoroughly with the water to obtain a clear, red liquid.

TABLE 7B

| water-based component | |
|---|---|
| Ingredient | Amount (gram) |
| modified starch | 1 |
| Beet coloring powder | 1 |
| Maltodextrin | 3 |
| water | 20 |
| Total | 25 |

The water component/blood substitute mixture was then mixed in a heated mixer at 79° C. for 10 minutes with stirring, to form a gel.

Fat-Containing Component

A commercially available palm shortening (Spectrum Naturals) was used as an animal fat substitute/fat-based component.

The fat % (WB) in this component is: 100%

Meat Analogue #6 According to Assembly Plan #6

A 3D model was prepared using Solidworks modeling software as provided in FIG. 5A-5B. The 3D model was loaded to a Hy-Rel SR30 3D printer, and sliced with Slic3r software.

The muscle component was loaded into a 60 cc syringe having a 1 mm Luer-Lok™ tip, the fat and blood component were loaded into a 60 cc syringe having a 0.5 mm Luer-Lok™ tip. The meat analogue was printed using the Hy-Rel SR30 printer, resulting in a meat-analogue matrix.

The percentage of protein and fat in the meat analogue #6 was

Protein: 12.62% wb
Fat: 17.49% wb
Carbohydrates: 6.94% wb

The final meat analogue was tested for various textural properties in a Lloyd™ Texture analyzer system and compared to popular meat cuts, and showed similar textural parameters.

Example 7—Preparation and Testing of Meat Analogue #7 According to Assembly Plan #7

Protein-Containing Component 1000 grams of the following powder mix were prepared by mixing the dry ingredients in Table 8A, in the Ninja® Kitchen System mixer for 10 minutes.

TABLE 8A

| protein component | |
|---|---|
| Ingredient | amount (gram) |
| Rehydrated textufized vegetable protein | 810 |
| natural beef flavor | 75 |

TABLE 8A-continued

| protein component | |
|---|---|
| Ingredient | amount (gram) |
| Beet coloring powder | 20 |
| Palm oil | 55 |
| Dietary fibers | 20 |
| modified starch | 20 |
| Total | 1000 |

Subsequently, the powder mix was mixed, in a mixer, along with 1,000 grams of water.

The protein containing component was loaded into a stainless steel tube equipped with a 5 mm Luer-Lok™ tip.

The protein % (WB) in this component was: 22.2%

Water-Containing Component:

The dry powders from Table 8B were mixed thoroughly with the water to obtain a clear, red liquid acting as the blood substitute.

TABLE 8B

| Water component | |
|---|---|
| Ingredient | amount (gram) |
| Beet coloring powder | 40 |
| Agar | 10 |
| water | 450 |
| Total | 500 |

The blood substitute mixture is then mixed in a heated mixer at 70° C. for 15 minutes, with continuous stirring.

Fat-Containing Component

A commercially available palm shortening (Spectrum Naturals) was used as an animal-fat substitute.

The fat % (WB) in this component is: 100%

The percentage of protein and fat in the meat analogue #7 was

Protein: 18.33% wb
Fat: 12.5% wb
Carbohydrates: 13.22% wb

Meat Alternative #7 Assembly Plan #7

A meat assembly plan for the above meat alternative #7 was designed to resemble a hamburger meat analogue (anisotropic product) and was constructed in the following manner:

M—Muscle (protein-containing units or strands) (5 mm nozzle size), 5 cm strand
F—Fat (1 mm nozzle size), 5 cm strand
B—Blood substitute (water-containing component) (1 mm nozzle size), 5 cm strand

| Layer | Layer Plan |
|---|---|
| 1 | MMMMMMMMMMMM |
| 2 | MMMMMMMMMMMM |
| 3 | MBBBBBBBBBBBBM |
| 4 | MFFFFFFFFFFFFFFM |
| 5 | MFFFFFFFFFFFFFFM |
| 6 | MMMMMMMMMMMM |
| 7 | MFFFFFFFFFFFFFFM |
| 8 | MBBBBBBBBBBBBM |
| 9 | MMMMMMMMMMMM |
| 10 | MMMMMMMMMMMM |

The meat analogue #7 was manually assembled according to the meat assembly plan #7 above. The prepared meat analogue was slightly pressed manually to form a cohesive patty. The patty was grilled on a charcoal grill at a medium temperature, 2 minutes on each side.

The final meat analogue was served inside a bun contacting mayonnaise and ketchup, to several tasters. The tasters concluded that the meat analogue was juicy, and had qualities resembling that of a medium-cooked beef hamburger.

Example 8—Additional/Alternative Protein Based Components

Example 8A—Protein Based Component with Disintegrated TVP

Composition:

The composition of a protein based component with disintegrated TVP is provided in Table 9A:

TABLE 9A

| TVP containing protein based component | | |
|---|---|---|
| | % | |
| Component | Example 1 | Example 2 |
| Gluten | 34.06 | 34.06 |
| Soy protein isolate (Solea) | 18.22 | 18.22 |
| TVP. Size 1-2 cm | 23.86 | 0 |
| TVP. Size 3-5 cm | 0 | 23.86 |
| Flavor mix (Givaudan) | 6.51 | 6.51 |
| Beet color | 1.74 | 1.74 |
| Palm kernel oil | 5.42 | 5.42 |
| Beef flavor fat | 5.42 | 5.42 |
| Lecithin | 0.43 | 0.43 |
| Citrus Fibers (Interfiber) | 4.34 | 4.34 |
| Total (without water) | 100.00 | 100.00 |

To the above, water was added as 2.17 grams water per 1-gram dry components.
Process of Preparation:
The disintegrated TVP containing component was prepared according to the following procedure:
  Soaking the TVP in water for at least 2 hours
  Squeezing the TVP
  Insert the TVP into food processor (non-cutting blade), aggressive mixing until disintegrating TVP fibers.
  Inserting the rest of the powder ingredients, and continue mixing:
  Adding the fat (as liquid, after preheating) and water and continue mixing, to uniform mass at medium viscosity.
  Printing using auger screw extruder equipped with 1.55 mm diameter nozzle at rate of 0.5 Liter/hour
Post-Process Handling
  Heat treatment (sous-vide or steam oven) at 80-90C for 45 min.
  Cutting into 2 cm slices
  Frying on a strip pan, one minute or two on each side.
Results The resulting component exhibited a distinct Meat-like fibrous texture for both examples. Specifically, Example 2 had better texture (more fibrous, better hardness of bite), probably since it contains longer protein fibers compared to example 1.

The protein % (wb) in this example is 18.3%

Example 8B—Protein Based Component with Gluten (without Disintegrated TVP)

Composition

The composition of a protein based component with gluten is provided in Table 9B:

TABLE 9B

| TVP containing protein based component | |
|---|---|
| Component | % |
| Gluten (Roquette) | 43.38 |
| Soy protein isolate | 26.25 |
| Nut Yeast | 13.02 |
| Coconut Oil | 11.93 |
| methyl cellulose | 1.08 |
| Sodium Alginate | 1.74 |
| Lecithin | 0.43 |
| Chia | 2.17 |
| Total (without water) | 100.0 |

To the above, water was added as 2.17 grams water per 1-gram dry components.
Process of Preparation:
The disintegrated TVP containing component was prepared according to the following procedure:
  Inserting the powder ingredients into food processor and mix
  Adding the fat (as liquid, preheated) and water and continue mixing, to uniform mass at medium viscosity
  Printing using auger screw extruder equipped with 1.55 mm diameter nozzle at rate of 0.5 Liter/hour
Post-Process Handling
  Heat treatment (sous-vide or steam oven) at 80° C.-90° C. for 45 min.
  Cutting into 2 cm slices
  Frying on a strip pan, one minute or two on each side.
The protein % (wb) in this example is 20%
Results The resulting component exhibited an "omelet like" texture, with very little fibers.

Example 8C—Protein Based Component Based on Small TVP Flakes/Chopped TVP

Composition

The composition of a protein based component based on flakes of/chopped TVP is provided in Table 9C:

TABLE 9A

| flakes/chopped TVP containing protein based component | |
|---|---|
| Component | % |
| Water | 59.91 |
| Texturized protein Small/chopped to 0.3-0.6 cm | 16.00 |
| Methylcellulose | 3.00 |
| Chopped onion | 3.00 |
| Flavor mix (Givaudan) | 4.04 |
| Brown color natural extract | 0.5 |
| red color natural extract | 0.5 |
| Palm fat | 13.05 |
| Total (w.b.) | 100.00 |

Process of Preparation:

The disintegrated TVP containing component was prepared according to the following procedure
- Add the water to the texturized proteins and colors
- Mix and leave to rest for 15 min
- Add the rest of the ingredients to the mixture
- Mix for 3 minutes at medium mixing speed (food mixer) of 10,000 rpm
- Printing using auger screw extruder equipped with 1.9 mm nozzle diameter at rate of 0.5 Liter/hour Post-Process Handling
- Bake in the oven, 7 min 120C
- Vacuum seal and store at 40C
- Pan-fry in vegetable oil for 2-3 minutes on each side, medium heat.

The protein % (wb) in this example is 11.2%

Results

The result component resembled meat kebabs-fatty minced meat texture (the fat is spread homogenously in solid chunks through the meat analogue). The result was aromatic and flavorful. At several tastings-all were generally favorable.

Example 8D—Protein Based Component for On Line Texturization

Composition:

A composition that is based on soy/pea/gluten/bean, suitable for On-line texturization is provided in Table 9D:

TABLE 9D

| Protein based component for on line texturization | | | |
|---|---|---|---|
| | % | | |
| Component | Example 1 | Example 2 | Example 3 |
| Soy Protein | 10.0 | 12.0 | 22.0 |
| Pea protein | 0.0 | 7.2 | 0.0 |
| Gluten | 4.0 | 4.8 | 0.0 |
| Mung Bean protein | 6.0 | 0.0 | 0.0 |
| Vegetable oil | 1.0 | 1.0 | 1.0 |
| Water | 74.7 | 70.7 | 71.7 |
| Flavor mix | 2.0 | 0.0 | 0.0 |
| Brown color natural extract | 0.3 | 0.3 | 0.3 |
| Red color natural extract | 0.3 | 0.3 | 0.3 |
| Maltodextrin | 1.7 | 3.7 | 4.7 |
| Total (w.b) | 100.00 | 100.00 | 100.00 |

Process of Preparation
- Mix all for 4 minutes at high mixing speed of 10,000 PM
- Printing via auger-mechanism printhead, using the following parameters:
  - single nozzle, diameter: 1 mm
  - Pressure: 20 bar
  - Temperature: 110° C.
  - Screw diameter: 8 mm
  - Screw pitch: 8 mm
  - Screw length: 250 mm
  - Dispensing rate: 0.3 liter/hour The protein % (wb) for example 1 is 17.1%
The protein % (wb) for example 2 is 20.37%
The protein % (wb) for example 3 is 19.8%

Post-Process Handling
- Pan-fry in vegetable oil for 1-3 minutes on each side, medium heat.

Results

The resulting components were tested using TPA under the conditions described herein, and the results were compared to beef tenderloin, indicating that the component was close to the meat specimen in textural terms.

Example 9—Preparation of Emulsion Based Fat Containing Component

While emulsions may vary in composition, preparation methods, and properties, this example an emulsion is prepared from 20% water, 79% oil (e.g., Canola oil) and 1% emulsifier (e.g., lecithin). The emulsifier is mixed with the oil. Water is then added to the mixture gradually while stirring. The mixture was then emulsified in a homogenizer for ~4 minutes. The emulsion behaved as a pseudoplastic fluid.

Fat percentage in the fat based component was 79%

Example 9A—Canola Oil Based Component

Composition:

The composition of a fat-based component with canola oil is provided in Table 10A:

TABLE 10A

| Canola oil based component | |
|---|---|
| Component | % |
| Canola oil | 37.40 |
| Water | 42.30 |
| Methylcellulose (Methocel) | 4.00 |
| Soy protein isolate (Solae) | 4.00 |
| Soaked TVP | 10.00 |
| Lecithin | 1.00 |
| Mono- and diglycerides | 1.00 |
| Locust bean gum (LBG) | 0.30 |
| Total | 100.00 |

Process of Preparation
- Using a thermomix (culinary standard mixer):
- soak TVP in cold water
- Mix Water+Oil at low speed and heat to 55° C.
- Gradually add methyl cellulose at low speed
- Add lecithin and Mono- and diglycerides
- Add LBG, mix well in high speed
- Stop Heating
- Add soy protein isolate and mix well at high speed
- Squeeze the soaked TVP and add to the mixture. Mix at high speed
- Cool the mixture over night
- Determine textural parameters using TPA as described herein after heating in over/using pan.

The resulting component was a stable, firm and cohesive emulsion.

Example 9B—Canola Oil-Based Component

Composition:

The composition of a fat based component with canola oil is provided in Table 10B:

TABLE 10B

| Canola oil based component | |
|---|---|
| Component | % |
| Distilled Water | 64.85 |
| Sodium alginate | 2.00 |
| Canola Oil | 20.00 |
| Mono- and diglycerides | 1.00 |
| Oat | 8 |
| $CaCl_2$ | 0.15 |
| Methylcellulose | 4 |
| Total | 100.0 |

Process of Preparation
Using a thermomix:
Mix distilled Water+Oil at medium speed and heat to 55° C.
Gradually add Methylcellulose at low speed
Add Mono- and diglycerides
Stop Heating
Add oat and mix well at medium speed
Add sodium alginate
Add $CaCl_2$ with dispersed in small amount of water
Cool the mixture over night
Check texture parameters using TPA after heat in oven/using pan
The fat % (WB) in this example was 21%

Example 10—Preparation of a Water Based Component as a Gel

Example 10A—Methylcellulose

A formulation containing 3% methylcellulose (by weight) in water, at 4° C., was blended for 1 minute in a mixer at 5,000 RPM, to produce a moisturizing gel that was extrudable in a 3D printer, and maintained a gel texture at a temperature of 50° C. To this water containing component, food coloring, flavor additives, etc., may be added.

Example 10B—Beetroot Powder

Two formulations were prepared based on beetroot powder (10B and 10C).
Composition:

The compositions of two beetroot powder-based water components are provided in Table 11B:

TABLE 11B

| beetroot powder-based water component | | |
|---|---|---|
| | % wb | |
| Component | Example 10B | Example 10C |
| Beetroot powder | 1.1 | 1.1 |
| Beef flavor mix (Givaudan) | 2.45 | — |
| Carrageenan Kappa | — | 1 |
| Maltodextrin | — | 2.95 |
| Water | 96.45 | 94.95 |

When examining the two formulations, Example 10B did not exhibit any unique texture, while Example 10C formed a gel. Therefore, it was concluded that a water-based components suitable for the production of meat analogue is achievable using this method.

Example 11—Whole Slab Printing from Fat and Protein Components

The following are additional examples for 3D printing of whole muscle slab, making use of various fat based components, protein based component and water based component.

TABLE 12A

| fat based component | |
|---|---|
| Component | % w |
| Canola oil | 37.40 |
| Water | 44.30 |
| Methylcellulose MX | 4.00 |
| Soy protein isolate | 4.00 |
| Soaked TVP response 4410 | 10.00 |
| LBG | 0.30 |
| Total | 100.00 |

The fat based component was prepared by the following procedure:
Using a Thermomix TM5 mixer:
Mix water with oil at a speed of 3.5 and heat to 55° C.
Gradually add methylcellulose at low speed (1.5-3)
Add LBG and then TVP, mix hard (4.5-6)
Stop Heating
Add soy protein isolate, mix well (3.5)
Cool the mixture over night
Check texture parameters after heat in oven/frying pan.
The fat % (WB) in this example was 37.4%.

TABLE 12B

| Protein-based component | |
|---|---|
| Component | % |
| Gluten | 7.3 |
| Soy protein isolate | 7.3 |
| TVP supromax 5050 | 8.6 |
| Green bean thread noodles | 8.6 |
| Nut. Yeast | 2.6 |
| Palm kernel oil | 5.2 |
| Mono- and diglycerides | 0.1 |
| Water | 60.3 |
| Total | 100.0 |

The protein-based component was prepared by the following procedure:
Soak TVP and Green bean thread noodles in cold water, squeeze it. Weight before and after soaking in order to calculate additional water required for the formulation
mixing well the powders
add the oil and then the water
add TVP and noodles, mix for 5 minutes at high speed
The protein % (WB) in this example was 19.36%.

Figure 8A:
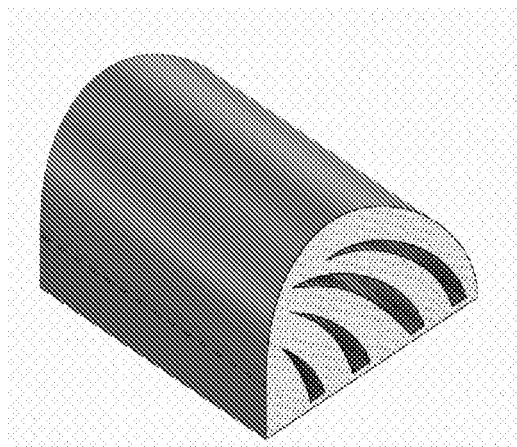
FIGS. 8A-8C provide an illustration (FIG. 8A) of a 3D model of a printed whole muscle slab, and an image of the resulting 3D printed slab of meat alternative before frying (FIG. 8B) and sliced after frying (FIG. 8C).
Figure 8B:
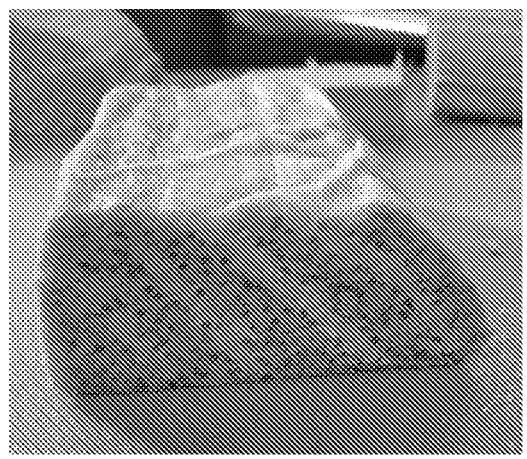

The protein-based and fat-based components were then 3D printed using two auger-screw extruders equipped with a 1.55 mm diameter stainless steel nozzle, and the 3D model presented in FIG. 8A. FIG. 8B shows a cross sectional image of the resulting slab.

Figure 8C:
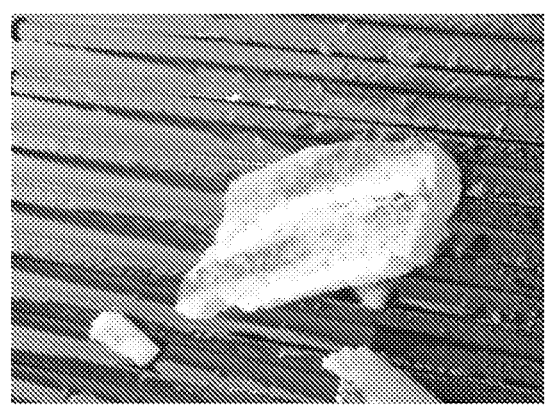

The 3D printed slab was treated using Sous vide (90° C. for 45 min) and then fried till getting inner temperature of 70° C. An image of the fried sample is provided in FIG. 8C, which shows that the sample maintained its structure (did not disintegrate during cooking/frying). The resulting whole slab had texture profile that resembles that of whole muscle beef cut.

Example 12—3D Printing of Kabab

The following is an example of 3D printing of a non-homogenous ground meat analogue, containing protein component (Table 13A) and fat component (Table 13B).

TABLE 13A protein based component

| Component | % wb |
|---|---|
| Water | 59.2 |
| Texturized soy protein (Response 4410, DuPont) | 14.7 |
| Coconut fat | 15 |
| Methyl cellulose (METHOCEL, Dow) | 3 |
| Frozen Onion | 3 |
| Beef Flavor (Givaudan) | 4.1 |
| Natural brown color | 0.5 |
| Natural red color | 0.5 |
| Total | 100 |

The protein-based component was prepared by separately sieving the various TVP components and then mixing with coloring agents. The mixture was then left close for 30 minutes with freshly boiled water so as to hydrate the TVP. Coconut fat was topped with fat-designated flavor at room temperature. The colored, soaked proteins were then moved to a mixer together with the onion-methylcellulose, The rest of the ingredients were mixed for 2 minutes. After mixing, the material was baked for 5 minutes at 110° C.
The protein % (W.B) in this example is 9.4%

TABLE 13B

Fat based component

| Ingredient | % wb |
|---|---|
| Beef flavoring (Givaudan) | 0.88 |
| Coconut oil (Poliva) | 99.12 |
| Total | 100 |

The fat component was thoroughly mixed with fat flavor and kept vacuumed at room temperature until printing.

The fat % (W.B) in this example was 99.12%

For printing, 350 ml of protein component was introduced into a feeder. Printing was done using an auger screw extruder equipper with a stainless steel 2 mm diameter nozzle at a flow of 1 kg/hour. Across the protein component 'muscle' strand array, fat component 'fat' strands in a diameter of 2 mm were added to a total of 14% wb.

Figure 9A:
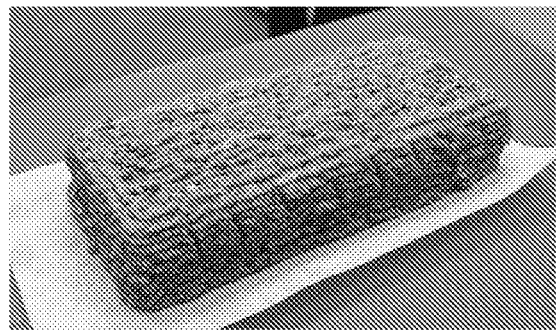
FIGS. 9A-9C provide images of a 3D printed minced meat product (FIG. 9A), as well as a cross sectional view showing fat component printed text ("BENNY", FIG. 9C) and a slice thereof after frying with no additional (externally added) oil (FIG. 9B).

An image of the resulting 3D printed kabab is provided in FIG. 9A.

Figure 9B:
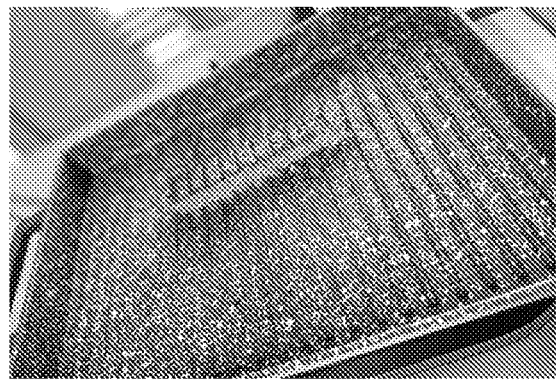
Figure 9C:

In a similar manner, and according to a predefined printing plan, a kabab with fat printed text was produced, as shown in FIG. 9B. A slice of the printed kabab was also successfully fried, while maintaining its integrity, as shown in FIG. 9C.

Example 13—Histology Characterization of 3D Printed Protein Based Component Vs. Non-Printed Component Generally, in accordance with the present disclosure, a slab is fabricated with the material being deposited while the print head is moving in the P axis (length axis). The material deposition is done via extrusion and optionally heating. At least 2 materials are deposited, specifically, a protein component and a fat component. This process results in distinct strands that together form the printed layers. The adhesion between the strands may differ in different cases, yet in all cases at least one of the following will be true.

The protein component composed of protein in either dissolved form, coagulated/aggregated form, dispersed form in form of fibrils, micro-fibrils or fibers. In all cases the extrusion process implies shear stress on the extruded material, and this results in at least partial orientation of some or all the protein material.

Figure 10:
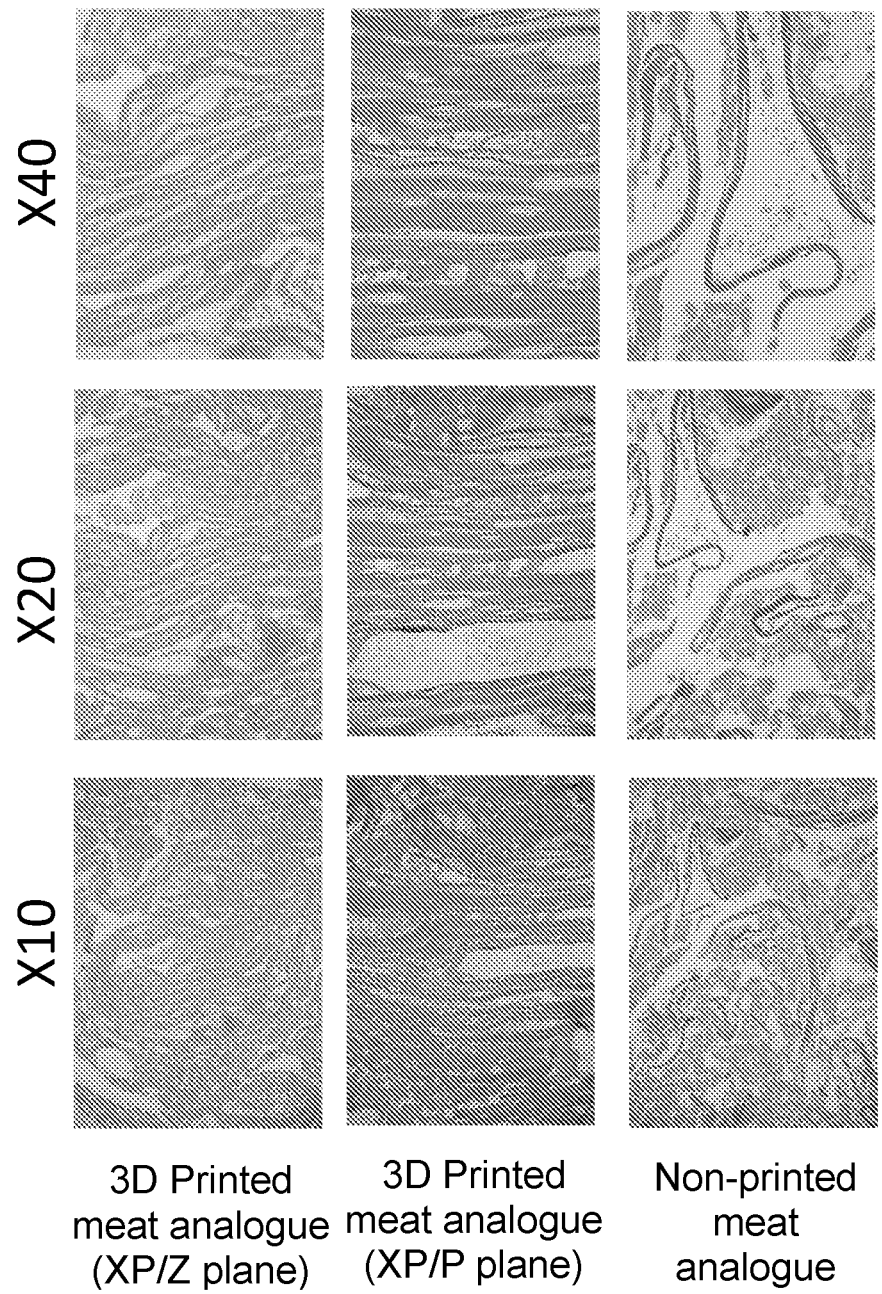
FIG. 10 include histology images of a protein containing component digitally printed based on Example 14 in comparison with protein containing component produced by molding the protein based component, without printing it (images taken with 5 μm slice thickness).

FIG. 10 demonstrates such a behavior observed in meat analogue specimens prepared in accordance with Example 14 below, after thermal treatment (Sous Vide 95° C. for 4 h), formaldehyde fixation, embedding in gel and in paraffin and sectioning into 5, 10 and 20 micrometer slices, according to a standard histology procedure. Then the slices were stained with Eosin and imaged on a Olympus, BX51 microscope (Olympus lifescience, Japan). Magnifications: ×10, ×20, ×40.

Specifically, FIG. 10 shows that the printed specimens have more protein fibers and that they possess preferred orientation, compared to the non printed specimen (identified in the respective Figure). When the section was done in parallel to P axis (XP/P plane=width/length plane) the orientation was more pronounced and uni-directional than in the section that is perpendicular to the P axis (XP/Z plane=width/height plane).

The lack of orientation was significant when compared to non-printed protein containing component that was manually molded instead of printing and then treated as the printed specimens.

Since the shear is highest at the extruder-material interface, in some cases the orientation at the strand outline is maximal. The outer region of the protein component strands may exhibit structural characteristics that are different from the inner (i.e. core) region.

Example 14—Textural Profile Analysis of 3D Printed Meat Alternative Slab

The printing process affects the physical properties of the meat analogue and render with anisotropic behavior.

The following composition of components (Table 14) and preparation procedure were used for preparing a meat analogue:

TABLE 14 composition of protein component

| Ingredients | % wb |
|---|---|
| Gluten | 5 |
| Soy protein isolate | 6.51 |
| TVP | 17.5 |
| Beer flavor | 2.38 |
| Palm kernel oil | 4.75 |
| Mono & diglycerides | 0.32 |
| Beta carotene | 0.08 |

TABLE 14-continued

| composition of protein component | |
|---|---|
| Ingredients | % wb |
| Red spice | 0.16 |
| Water | 63.3 |
| Total | 100 |

Soak TVP in water, Weight it before and after soaking in order to calculate additional water required for the formulation Melt palm kern oil with Mono & DI glycerides at 60C.

Use Ninja® BL862 Kitchen System mixer with plastic blades.

Mix gluten+SPI+beef flavor at low speed.

Add the melted oil+Mono & Diglycerides.

Mix the remaining water with beta carotene+red spice and add it to the Ninja. Mixer at high speed.

Add TVP and mix it at high speed till receiving homogenies mixture.

Wait over night before printing the formulation.

Print using auger screw extruder equipped with a stainless steel 1.55 mm diameter nozzle.

Cook the printed slab 45 min at 98° C. using commercial Sous Vide instrument.

Wait over night before frying.

Figure 11A:
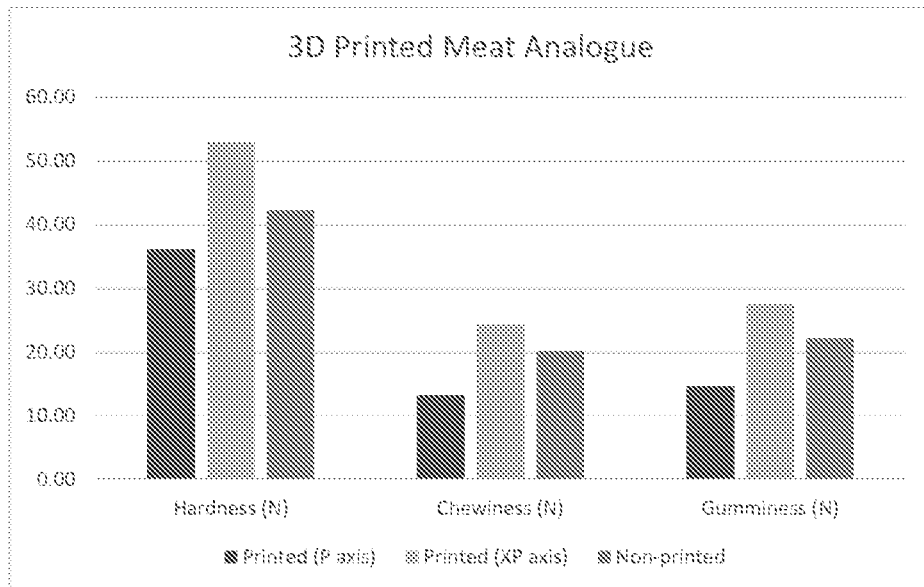
FIGS. 11A-11C are bar graphs of texture profile parameters of a meat alternative 3D printed in accordance with Example 14, in comparison to non-printed meat and real bovine meat (FIG. 11C)
Figure 11B:
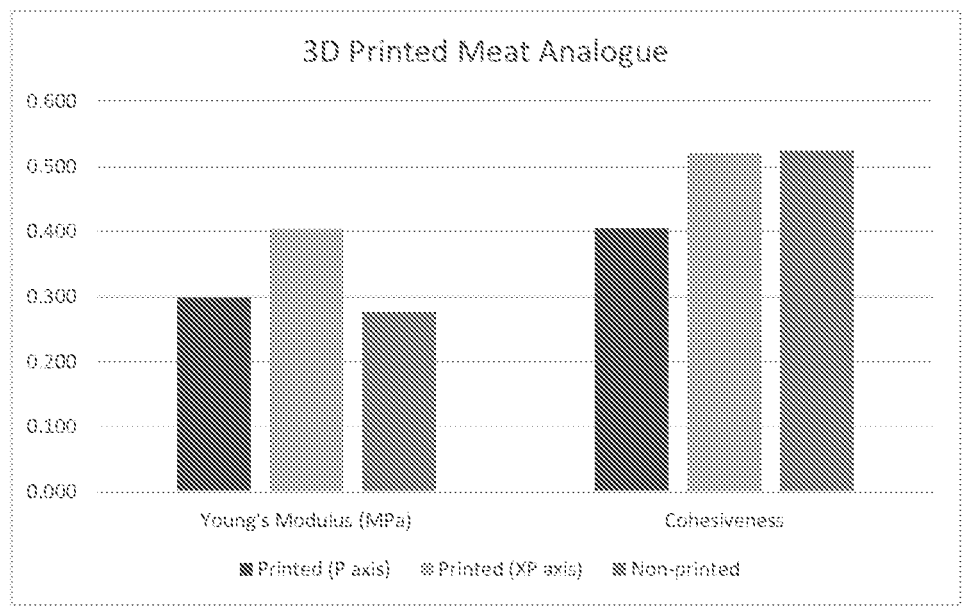
Figure 11C:
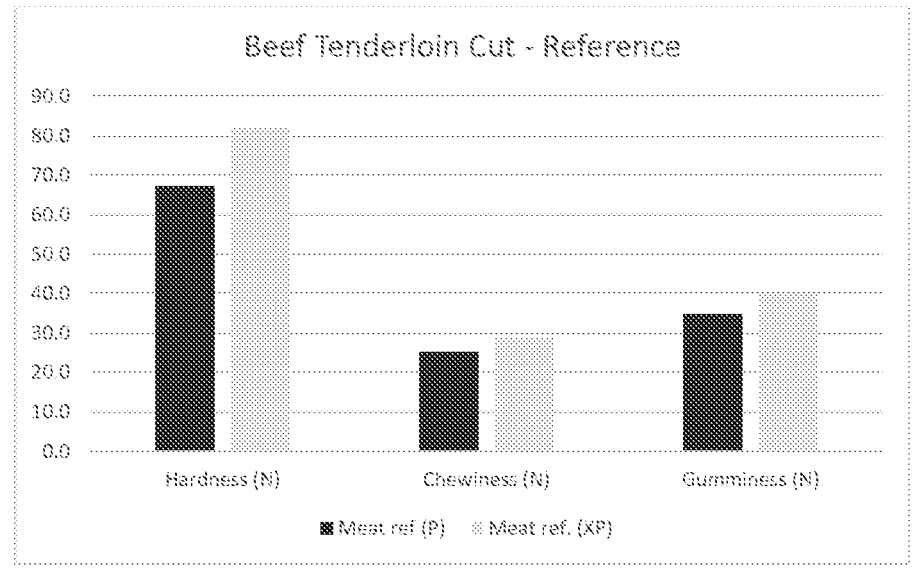
Figure 12A:
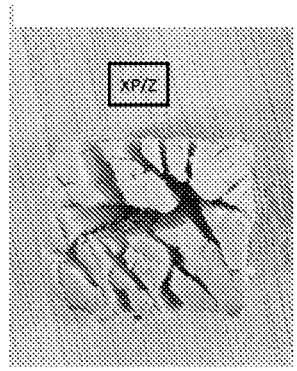
Figure 12B:
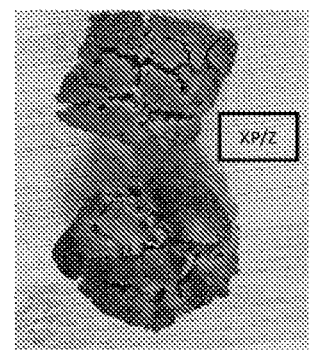
Figure 12C:
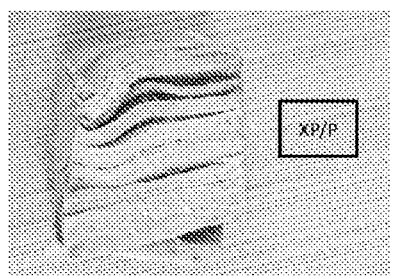
Figure 12D:
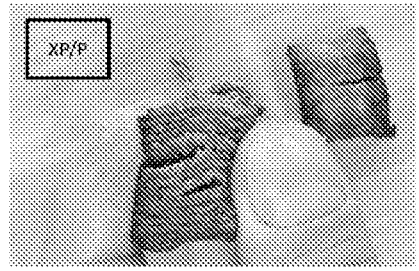
Figure 13C:
Figure 13D:
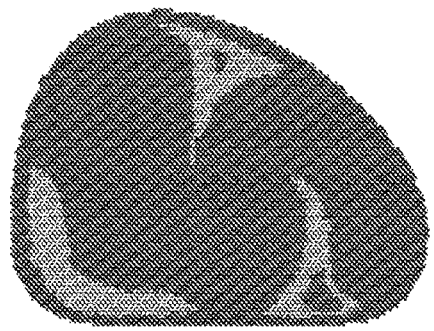
Figure 13E:
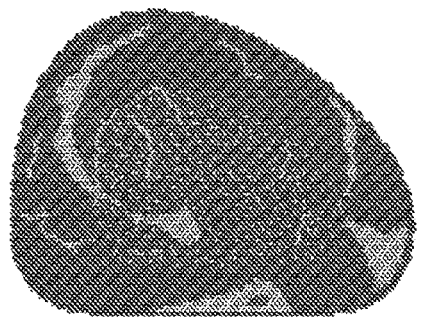
Figure 13F:
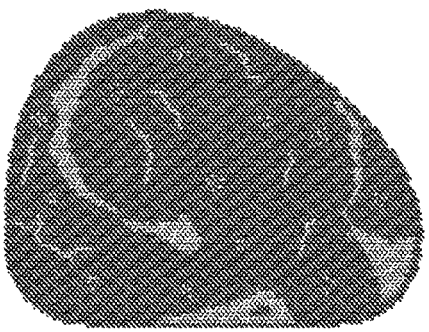
Figure 13G:
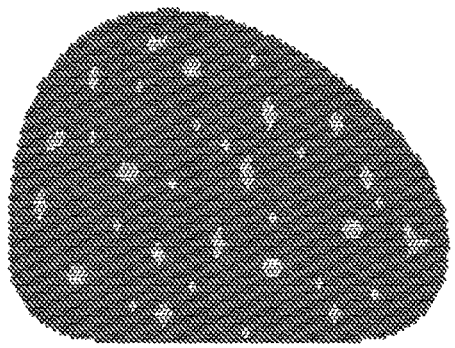
Figure 13H:
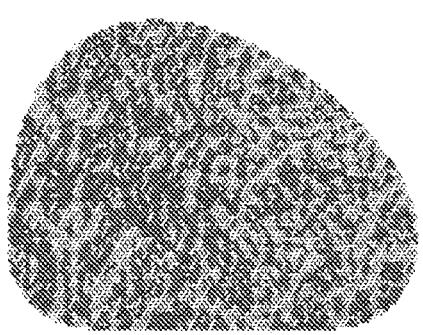

Specifically, the following textural parameters were examined Young's Modulus, Hardness and Chewiness and were shown to exhibit different values when measured in the P (length) axis vs. the XP (width) axis. The results are provided in Table 15 and in FIG. 11A (P axis) FIG. 11B (XP axis) and in comparison with true meat as shown in FIG. 11C.

TABLE 15

TPA characterization-comparison with non printed meat analogue or true meat

| | 3D Printed meat analogue, cooked in sous vide @ 95 C. for 4 h | | | | Non-printed meat analogue, cooked in sous vide @ 95 C. for 4 h | |
|---|---|---|---|---|---|---|
| | Along | | Perpendicular | | | |
| | fiber axis (P) | St.Dev (%) | to fiber axis (XP) | St.Dev (%) | Random axis | St.Dev (%) |
| Hardness (N) | 36.09 | 4.0 | 52.85 | 4.9 | 42.17 | 6.4 |
| Young's Modulus (MPa) | 0.299 | 2.8 | 0.404 | 3.3 | 0.277 | 8.6 |
| Cohesiveness | 0.405 | 3.9 | 0.520 | 5.2 | 0.524 | 3.6 |
| Chewiness (N) | 13.21 | 5.9 | 24.23 | 5.0 | 20.11 | 10.4 |
| Gumminess (N) | 14.61 | 6.1 | 27.44 | 4.9 | 22.13 | 9.7 |

| | Bovine Meat (Tenderloin cut, cooked @ 200° C. oven for 30 min) | | | |
|---|---|---|---|---|
| | Along fiber axis (P) | St.Dev (%) | Perpendicular to fiber axis (XP) | St.Dev (%) |
| Hardness (N) | 67.3 | 14.4 | 81.8 | 8.0 |
| Young's Modulus (MPa) | 0.97 | 14.3 | 0.99 | 21.7 |
| Cohesiveness | 0.52 | 13.2 | 0.52 | 6.7 |
| Chewiness (N) | 25.2 | 13.7 | 28.9 | 18.9 |
| Gumminess (N) | 34.9 | 11.4 | 39.9 | 18.2 |

Specifically, the textural parameters show that in printed meat analogue specimens according to the present disclosure all measured TPA parameters had higher values when measured in parallel to XP axis when compared to P axis. Without being bound thereto, this may be explained by the fibrils and strands detachment when the compressive stress was applied in parallel to the printed strands axis. A similar behavior was partially observed in real cooked meat, where the hardness was also higher in the direction perpendicular to fibers direction. For the printed meat analogue the hardness in P axis is 36 N, while in XP axis it is 53 N. For the tenderloin cut the P axis the hardness is 67 N, while in XP axis it is 82 N.

Example 15—Comparison with Actual Animal Meat

The deposited strand has imperfect adhesion to the neighboring strands presumably due to air gaps or insufficient interaction between (e.g. the high MW molecules of one strand does not penetrate into another) and once a stress is applied a failure occurs preferentially via delamination at the boundaries between strands rather that via disruption of the strand bulk. This manifests itself by an anisotropy in mode of failure, in parallel to P axis (linear bended cracks) vs in perpendicular to P axis (tortuous and branched cracks). This behavior was compared to that of real meat behavior and the comparison is shown in FIGS. 12A-12G.

Specifically, FIGS. 12A-12G demonstrate the difference in behavior between cooked tenderloin beef (FIGS. 12A, 12C and 12E) vs. cooked printed meat analogue (FIGS. 12B, 12D, 12F and 12G) prepared similarly to the meat analogue in example 14. In both product types a manual application of stress resulted in a different mode of failure in parallel to P axis (linear bended cracks) vs in perpendicular to P axis (tortuous and branched cracks), being indicative that both the 3D printed meat alternative and the true meat product exhibit anisotropic textural behavior.

The invention claimed is:

1. A method for producing a meat slab analogue, the method comprising:
    printing layers including one or both of dispensed protein-based component that predominantly comprises a protein- and fat-based component that predominantly comprises fat,
    wherein said printing is configured to provide:
        one or more segments comprising the protein-based component which is chemically distinct from other segments comprising the fat-based component;
        layers comprising printed strands of the protein-based component that are substantially aligned with printing direction of the meat slab analogue;
        at least one layer with, separately distributed therein, a fat-based component and a protein-based component;
        dimensions of the meat slab analogue that are sufficient to permit slicing therefrom of individual steak slices of between 0.5 cm to 10 cm wide, when said slicing is in a direction essentially perpendicular to the direction of the strands of the protein-based component; and
    at least one of:
        (i) an anisotropic physical property in a cubic sample of the meat slab analogue, when said physical parameter is measured from three different directions of the cubic sample; or
        (ii) a non-homogenous distribution of the protein-based component and the fat-based component within the meat slab analogue.

2. The method of claim 1, wherein said printing is configured to provide an anisotropic physical property in a cubic sample of the meat slab analogue.

3. The method of claim 1, wherein said printing is according to a pre-defined assembly plan defining spatial arrangement of the protein-based component and the fat-based component one with respect to the other.

4. The method of claim 1, further comprising printing strands of the protein-based component and optionally printing strands of the fat-based component.

5. The method of claim 1, further comprising texturizing the protein-based component prior to depositing strands of the protein-based component onto a printing bed.

6. The method of claim 1, further comprising printing at least three layers.

7. The method of claim 6, wherein at least two of said at least three layer are non-identical.

8. The method of claim 1, further comprising printing layers to obtain a meat slab analogue having dimensions of (i) a length between 10 cm to 50 cm, a height of between 10 cm to 15 cm and a width of between 12 cm to 20 cm; or (ii) a length between 30 cm to 100 cm, a height of between 15 cm to 30 cm and a width of between 20 cm to 40 cm.

* * * * *